US011904741B2

(12) United States Patent
Shibata et al.

(10) Patent No.: US 11,904,741 B2
(45) Date of Patent: Feb. 20, 2024

(54) NURSERY EQUIPMENT

(71) Applicant: GRACO CHILDREN'S PRODUCTS, INC., Atlanta, GA (US)

(72) Inventors: Yuji Shibata, Tokyo (JP); Tadashi Nishikawa, Tokyo (JP); Tomoyuki Honda, Tokyo (JP)

(73) Assignee: GRACO CHILDREN'S PRODUCTS, INC., Atlanta, GA (US)

( * ) Notice: Subject to any disclaimer, the term of this patent is extended or adjusted under 35 U.S.C. 154(b) by 50 days.

(21) Appl. No.: 17/660,607

(22) Filed: Apr. 25, 2022

(65) Prior Publication Data

US 2022/0354273 A1 Nov. 10, 2022

(30) Foreign Application Priority Data

May 7, 2021 (JP) .................................. 2021-079142

(51) Int. Cl.
*B60N 2/28* (2006.01)
*A47D 15/00* (2006.01)
*A47D 13/02* (2006.01)
*B65H 54/28* (2006.01)

(52) U.S. Cl.
CPC ......... *B60N 2/2887* (2013.01); *A47D 13/025* (2013.01); *A47D 15/005* (2013.01); *B65H 54/2857* (2013.01)

(58) Field of Classification Search
CPC ............. A47D 15/005; B65H 54/2857; B60N 2/2887; B60N 2/2812
See application file for complete search history.

(56) References Cited

U.S. PATENT DOCUMENTS

| 5,383,708 A | 1/1995 | Nagasaka et al. |
| 5,490,685 A | 2/1996 | Kitayama et al. |
| 7,004,362 B2 | 2/2006 | Boone |
| 7,726,737 B2 | 6/2010 | Jane Santamaria |
| 8,038,214 B2 * | 10/2011 | Brandl ................. B60N 2/2812 297/484 |
| 8,328,275 B2 * | 12/2012 | Vogt ..................... B60N 2/2851 297/216.11 |

(Continued)

FOREIGN PATENT DOCUMENTS

| JP | 2008290587 A | 12/2008 |
| JP | 2013162974 A | 8/2013 |

OTHER PUBLICATIONS

USPTO Office Action issued in U.S. Appl. No. 17/660,600, dated Oct. 3, 2023.

(Continued)

*Primary Examiner* — Milton Nelson, Jr.
(74) *Attorney, Agent, or Firm* — Eversheds Sutherland (US) LLP

(57) ABSTRACT

An adjustment mechanism of nursery equipment includes a string connecting a fixed portion and a movable portion, a reel that is rotatable in both forward and reverse directions and that changes the position or shape of the movable portion by winding up and feeding out the string, a biasing member that biases the reel in such a way that the reel rotates in a winding direction of the string, and a lock member that prohibits rotation of the reel. A biasing force of the biasing member is selected to be smaller than a biasing force with which the movable portion tends to move downward in the vertical direction.

20 Claims, 33 Drawing Sheets

(56) References Cited

U.S. PATENT DOCUMENTS

| | | | |
|---|---|---|---|
| 8,444,222 B2 | 5/2013 | Buckingham et al. | |
| 8,967,715 B2 | 3/2015 | Carpenter et al. | |
| 9,643,765 B2 * | 5/2017 | Pivonka | B60N 2/2812 |
| 9,688,167 B2 | 6/2017 | Hutchinson et al. | |
| 10,829,011 B2 | 11/2020 | Campbell et al. | |
| 2013/0001992 A1 | 1/2013 | Hartenstine et al. | |
| 2018/0361888 A1 | 12/2018 | Campbell et al. | |
| 2022/0354272 A1 | 11/2022 | Shibata et al. | |
| 2022/0354273 A1 | 11/2022 | Shibata et al. | |
| 2022/0354274 A1 | 11/2022 | Shibata et al. | |

OTHER PUBLICATIONS

USPTO Office Action issued in U.S. Appl. No. 17/660,610, dated Oct. 20, 2023.

* cited by examiner

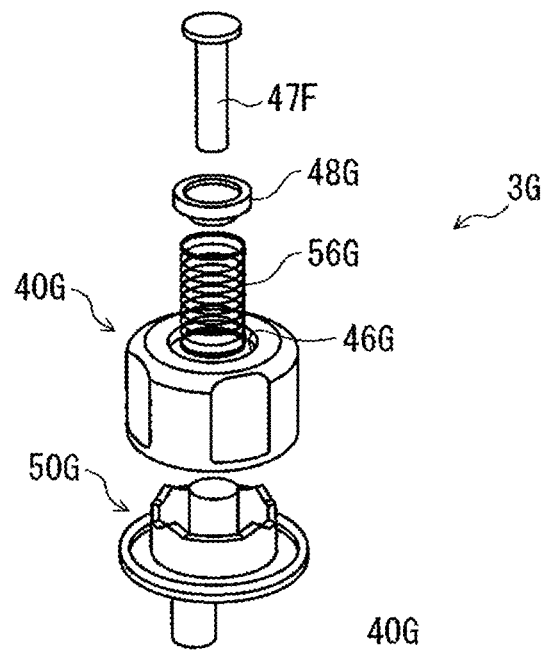
FIG. 32A
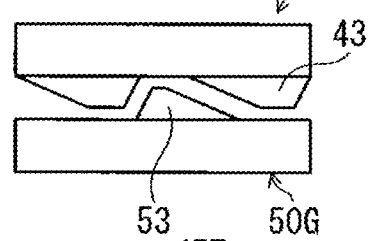
FIG. 32B
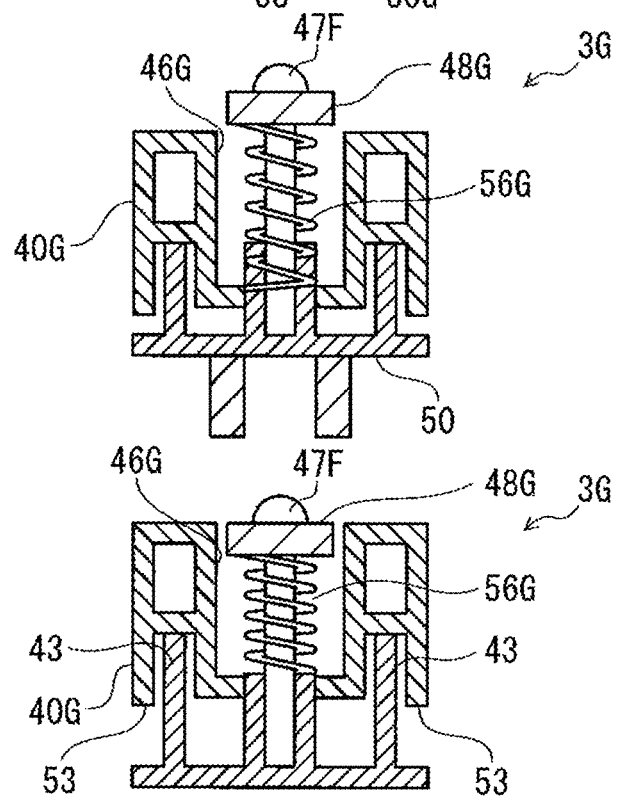
FIG. 32C
FIG. 32D

NURSERY EQUIPMENT

CROSS-REFERENCE TO RELATED APPLICATIONS

This application claims priority to JP Patent Application No. 2021-079142, filed May 7, 2021, the entire contents of which are incorporated herein by reference.

BACKGROUND OF THE INVENTION

Field of the Invention

The present invention relates to nursery equipment, and more particularly to nursery equipment including a fixed portion, a movable portion that is movable relative to the fixed portion, and an adjustment mechanism for adjusting the position or shape of the movable portion.

Background Art

Nursery equipment such as car seat, stroller, bassinet, and baby carrier typically has a movable portion that can be changed in position with respect to a fixed portion.

For example, Japanese Unexamined Patent Publication No. 2008-290587 (Patent Literature 1) discloses a car seat whose shoulder straps can be adjusted in length according to the body of a child. In this car seat, the length of each shoulder strap can be adjusted by merely pulling the tip end of the shoulder strap located on the back side of a seat portion.

For example, Japanese Unexamined Utility Model Publication No. H07-4248 (Patent Literature 2) discloses a stroller whose reclining angle can be adjusted by connecting belts to a handlebar and adjusting the length of the belts by a buckle attached to the back of a backrest portion.

For example, Japanese Unexamined Patent Publication No. 2013-162974 (Patent Literature 3) discloses a baby carrier that can be used to carry a baby in either an upright position or a reclined position. This baby carrier has shoulder straps to be placed around parent's shoulders, a waist strap to be placed around a parent's waist, and connection straps connecting a baby and a parent, and each of these straps can be adjusted in length.

CITATION LIST

Patent Literatures

Patent Literature 1: Japanese Unexamined Patent Publication No. 2008-290587
Patent Literature 2: Japanese Unexamined Utility Model Publication No. H07-4248
Patent Literature 3: Japanese Unexamined Patent Publication No. 2013-162974

SUMMARY OF INVENTION

In the nursery equipment disclosed in Japanese Unexamined Patent Publication No. 2008-290587, Japanese Unexamined Utility Model Publication No. H07-4248, and Japanese Unexamined Patent Publication No. 2013-162974, the length of the body restraint straps such as shoulder straps and the reclining angle need to be adjusted with both hands, and the structure is complicated.

The present invention was made to solve the above problems, and it is an object of the present invention to provide nursery equipment whose movable portion can be adjusted in position or shape by a simple structure.

Nursery equipment according to one aspect of the present invention includes: a fixed portion; a movable portion that is movable relative to the fixed portion; and an adjustment mechanism that adjusts a position or shape of the movable portion. The adjustment mechanism includes a string connecting the fixed portion and the movable portion, a reel that is rotatable in both forward and reverse directions and that changes the position or shape of the movable portion by winding up and feeding out the string, a one-way clutch mechanism that allows rotation of the reel in a winding direction of the string and prohibits rotation of the reel in a feeding direction of the string, and an unlock member that unlocks the reel from a rotation prohibited state caused by the one-way clutch mechanism and thus allows the reel to rotate freely.

Preferably, the adjustment mechanism further includes a rotation operation member that controls rotation of the reel.

Preferably, the adjustment mechanism further includes a biasing member that biases the reel in the winding direction of the string.

Preferably, the adjustment mechanism further includes a holder that rotatably supports the reel, the one-way clutch mechanism includes an engagement tooth located on one of the reel and the holder, and an engagement pawl attached to the other of the reel and the holder, the engagement pawl being movable between an engaged position in which the engagement pawl engages with the one of the reel and the holder and a disengaged position in which the engagement pawl does not engage with the one of the reel and the holder, and the unlock member includes an operation portion that is operated to move the engagement pawl to the disengaged position.

Preferably, the engagement tooth is located on an outer peripheral surface of the reel that extends parallel to a rotation axis of the reel, the engagement pawl is located on the holder and moves in a direction perpendicular to the engagement tooth, and the unlock member unlocks the reel from the rotation prohibited state by moving in a direction perpendicular to the rotation axis of the reel.

Preferably, the engagement tooth is located on the holder and extends in a circumferential direction of the reel, the engagement pawl is located on the reel and moves in a horizontal direction with respect to the engagement tooth, and the unlock member unlocks the reel from the rotation prohibited state by moving in the circumferential direction of the reel.

Preferably, the engagement tooth is located on an upper or lower surface of the reel that extends in a direction perpendicular to a rotation axis of the reel, the engagement pawl is located on the holder and moves in a direction perpendicular to the engagement tooth, and the unlock member unlocks the reel from the rotation prohibited state by moving in a direction parallel to the rotation axis of the reel.

Preferably, the nursery equipment is a car seat, the fixed portion is a seat, and the movable portion is a body restraint strap attached to the seat.

Preferably, the nursery equipment is a car seat, the fixed portion is a car seat body, and the movable portion is an ISOFIX attached to the car seat body.

Nursery equipment according to another aspect includes: a body; an extended portion extended from the body; and an adjustment mechanism that adjusts a position or shape of the extended portion. The adjustment mechanism includes a string having one end connected to the body and the other end held by the extended portion, a reel that is rotatable in both forward and reverse directions and that changes the position or shape of the extended portion by winding up and feeding out the string, and a rotation lock mechanism that prohibits rotation of the reel.

Preferably, the nursery equipment is nursery equipment with a seat, the body is the seat that receives a child, the extended portion is a pair of shoulder straps that is extended from the seat and restrains shoulders of the child, the adjustment mechanism includes a pair of the strings, and the pair of strings is held by ends of the pair of shoulder straps.

Preferably, the nursery equipment is nursery equipment with a seat, the body is the seat that receives a child, the extended portion is a crotch strap that is extended from the seat and restrains a crotch of the child, and the string is held by an end of the crotch strap.

Preferably, the nursery equipment is a car seat, the body is a car seat body, and the extended portion is an ISOFIX extended rearward from the car seat body.

Preferably, the nursery equipment is a baby carrier, the body is a baby carrier body, and the extended portion is a movable portion extended from the baby carrier body.

Preferably, the baby carrier body includes a parent shoulder strap to be worn around a shoulder of a parent, and a parent waist strap to be worn around a waist of the parent, and the extended portion is a portion extended from the parent shoulder portion or the parent waist portion.

Preferably, the baby carrier body includes a child support portion that supports a body of a child, and the extended portion is a portion extended from the child support portion.

Preferably, the adjustment mechanism further includes an unlock member that unlocks the reel from a rotation prohibited state caused by the rotation lock mechanism and thus allows the reel to rotate freely.

Nursery equipment according to still another aspect includes: a fixed portion; a movable portion that is movable relative to the fixed portion; and an adjustment mechanism that adjusts a position or shape of the movable portion. The adjustment mechanism includes a string connecting the fixed portion and the movable portion, a reel that is rotatable in both forward and reverse directions and that changes the position or shape of the movable portion by winding up and feeding out the string, a rotation operation member that controls rotation of the reel, a motion transmission portion that transmits a rotational motion of the rotation operation member to the reel, and a motion separation portion that does not transmit the rotational motion of the rotation operation member to the reel.

Preferably, the motion transmission portion normally transmits the rotational motion of the rotation operation member to the reel, and the rotation separation portion does not transmit the rotational motion of the rotation operation member to the reel under more than a certain load.

Preferably, when the rotation operation member rotates in one direction, the motion transmission portion transmits the rotational motion of the rotation operation member to the reel, and when the rotation operation member rotates in the other direction, the rotation separation portion does not transmit the rotational motion of the rotation operation member to the reel.

Preferably, the reel includes a reel body that winds up and feeds out the string, and a moving member that is located between the reel body and the rotation operation member, and the motion transmission portion or the motion separation portion includes a drive gear portion located on the rotation operation member and a driven gear portion located on the moving member.

Preferably, the moving member is biased in a direction toward the rotation operation member.

Preferably, the drive gear portion includes a first tilted portion tilted in a winding direction of the string from the reel toward the rotation operation member, and a second tilted portion tilted in a feeding direction of the string from the reel toward the rotation operation member, and an angle of the first tilted portion with respect to the winding direction is smaller than an angle of the second tilted portion with respect to the feeding direction.

Nursery equipment according to yet another aspect includes: a fixed portion; a movable portion that is movable relative to the fixed portion and that is movable downward in a vertical direction; and an adjustment mechanism that adjusts a position or shape of the movable portion. The adjustment mechanism includes a string connecting the fixed portion and the movable portion, a reel that is rotatable in both forward and reverse directions and that changes the position or shape of the movable portion by winding up and feeding out the string, a biasing member that biases the reel in such a way that the reel rotates in a winding direction of the string, and a lock member that prohibits rotation of the reel. A biasing force of the biasing member is selected to be smaller than a biasing force with which the movable portion tends to move downward in the vertical direction.

Preferably, the adjustment member further includes a one-way clutch mechanism that allows rotation of the reel in the winding direction of the string and prohibits rotation of the reel in a feeding direction of the string.

Preferably, the lock member includes a reel lock pawl that is movable between a first position and a second position, the first position being a position in which the reel lock pawl engages with a portion that rotates with the reel and prohibits rotation of the reel, and the second position being a position in which the reel lock pawl is disengaged from the portion that rotates with the reel and allows rotation of the reel.

Preferably, the adjustment mechanism further includes an unlock member that moves the lock member to the second position to allow the reel to rotate freely.

Preferably, the biasing member is a mainspring, one end of the mainspring is fixed to the reel, and the other end of the mainspring is fixed to a housing of the adjustment mechanism.

Preferably, the nursery equipment is a car seat, the fixed portion is a seat, and the movable portion is a body restraint strap attached to the seat.

The present invention provides nursery equipment whose movable portion can be adjusted in position or shape by a simple structure.

BRIEF DESCRIPTION OF DRAWINGS

FIG. 4A is a perspective view, FIG. 4B is a plan view, and FIG. 4C is a sectional view as viewed from line IVc-IVc in FIG. 4B.

FIG. 6A shows the state in which the unlock member is not operated, and FIG. 6B shows the state in which the unlock member is operated.

FIG. 9A shows the state in which a motion transmission portion is functioning, and FIG. 9B shows the state in which a motion separation portion is functioning.

FIG. 11A shows the state in which an unlock member is not operated, and FIG. 11B shows the state in which the unlock member is operated.

FIG. 12A is a perspective view, FIG. 12B is a plan view, and FIG. 12C is a sectional view as viewed from line XIIc-XIIc in FIG. 4B.

FIG. 14B shows the state in which the unlock member is operated.

FIG. 18A shows the state in which a motion transmission portion is functioning, and FIG. 18B shows the state in which a motion separation portion is functioning.

FIG. 21A is a perspective view, FIG. 21B is a plan view, and FIG. 21C is a sectional view as viewed from line XXIc-XXIc in FIG. 21B.

FIG. 27A is a bottom perspective view, and FIG. 27B is a plan view.

FIG. 29A shows the state in which a motion transmission portion is functioning, and FIG. 29B shows the state in which the motion separation portion is functioning.

FIGS. 32A to 32D shows a modification of the adjustment mechanism, where FIG. 32A is a perspective view, FIG. 32B is a schematic view of a drive gear of a rotation operation member and a driven gear of a moving member, FIG. 32C shows the state in which a motion transmission portion is functioning, and FIG. 32D indicates the state in which a motion separation portion is functioning.

DESCRIPTION OF EMBODIMENTS

Figure 1A:
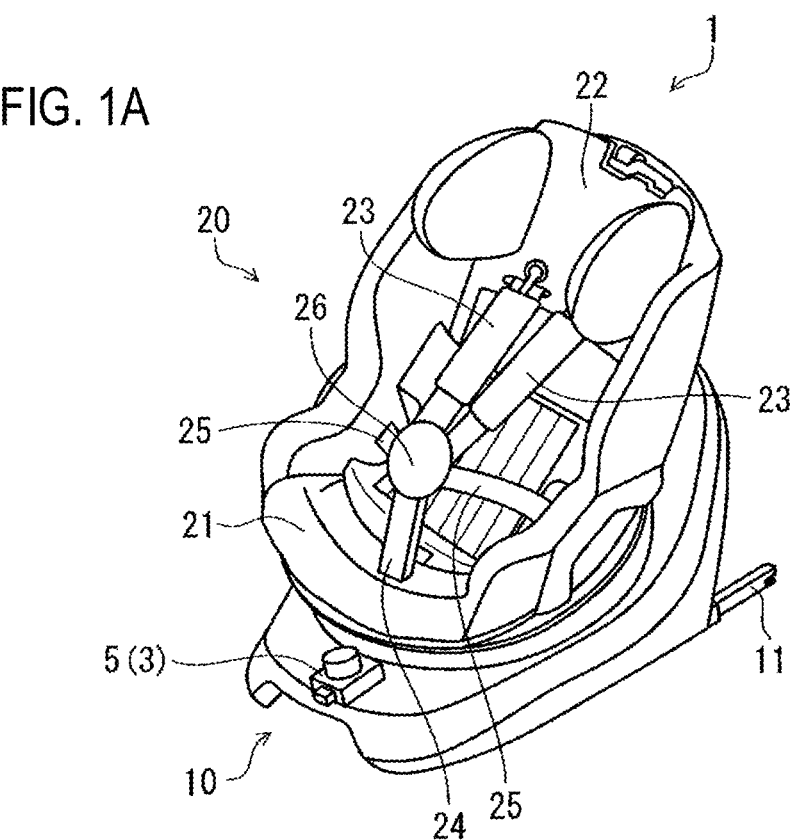
FIG. 1A is a perspective view of a car seat according to an embodiment of the present invention.

Embodiments of the present invention will be described in detail with reference to the drawings. The same or corresponding portions are denoted by the same reference characters throughout the drawings, and description thereof will not be repeated.

First, an example of nursery equipment with an adjustment mechanism 3 will be described. Examples of the nursery equipment with the adjustment mechanism 3 include a stroller, a car seat, a baby carrier, a bassinet, and a high chair. An example in which the present invention is applied to a car seat, a stroller, and a baby carrier will be described.

Overview of Nursery Equipment

An example of nursery equipment 1 according to an embodiment will be described with reference to FIGS. 1A to 3C.

Car Seat

First, an example in which the nursery equipment 1 is a car seat will be described. In the description of the car seat 1, the longitudinal direction corresponds to the longitudinal direction of the car seat 1, the lateral direction (width direction) corresponds to the lateral direction of the car seat 1 as viewed from the front of the car seat 1, and the vertical direction corresponds to the vertical direction of the car seat 1.

Referring to FIG. 1A, a basic structure of the car seat 1 may be similar to the structure of a typical car seat. The car seat 1 is a device that is installed on a seat of an automobile so that a child such as infant or toddler can safely ride in the automobile. The car seat 1 includes a base body 10 and a seat 20. The base body 10 and the seat 20 are a car seat body. The car seat body is a "fixed portion" of the present embodiment, and is also a "body" of the present embodiment.

The base body 10 is placed on a seat of a passenger car and supports the seat 20 from below. The base body 10 has at its front end a load leg (not shown) extending toward the floor of the passenger car. The base body 10 has, at its rear end, ISOFIX latches 11 to be connected to anchors of the seat of the passenger car. The ISOFIX latches 11 are portions protruding rearward from the car seat body (base body 10). The ISOFIX latches 11 are a "movable portion" of the present embodiment and are also an "extended portion" of the present embodiment.

The seat 20 is attached to the upper side of the base body 10, and is supported so as to be rotatable with respect to the base body 10. FIG. 1A shows the seat 20 with a soft cloth member such as a covering member like a cushioning material thereon.

The seat 20 includes a seat portion 21 and a backrest portion 22 standing from the rear part of the seat portion 21. Since a child is seated on the seat 20, the seat portion 21 supports the buttocks of the child, and the backrest portion 22 supports the back of the child. A cushioning structure is detachably provided in a corner portion where the seat portion 21 and the backrest portion 22 meet.

The backrest portion 22 is provided with a pair of shoulder straps 23. The shoulder straps 23 restrain both shoulders of the child seated on the seat 20. The seat portion 21 is provided with a crotch strap 24 and a pair of waist straps 25. The crotch strap 24 extends between the legs (both thighs) of the child seated on the seat 20, and the waist straps 25 restrain the waist of the child seated on the seat 20. A buckle 26 is provided at the tip end of the crotch strap 24, and the straps 23, 24, and 25 are connected near the belly of the child by the buckle 26. These straps 23, 24, and 25 are so-called 5-point harness straps. These straps 23, 24, and 25 are body restraint straps that restrain the body of the child, and are portions protruding forward from the car seat body (seat 20). These straps 23, 24, and 25 are a "movable portion" of the present embodiment and are also an "extended portion" of the present embodiment. The body restraint straps are also similarly applied to other nursery equipment.

Such a car seat 1 uses the adjustment mechanism 3. The adjustment mechanism 3 generally includes a string 4 and an adjustment mechanism body 5 that winds up and pulls out (feeds out) the string 4. Application of the adjustment mechanism 3 to the car seat 3 will be described first.

ISOFIX Latches

As shown in FIGS. 1A to 1D, the adjustment mechanism 3 of the car seat 1 of the present embodiment is used to adjust the positions of the ISOFIX latches 11. As shown in FIG. 1A, the adjustment mechanism 3 is located at a front position of the car seat body (base body 10).

Figure 1B:
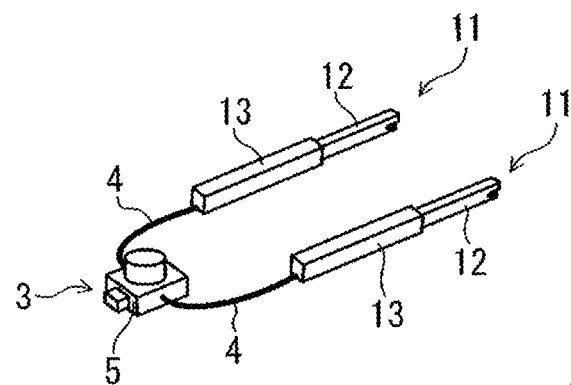
FIG. 1B is a perspective view of an adjustment mechanism and ISOFIX latches.
Figure 1C:
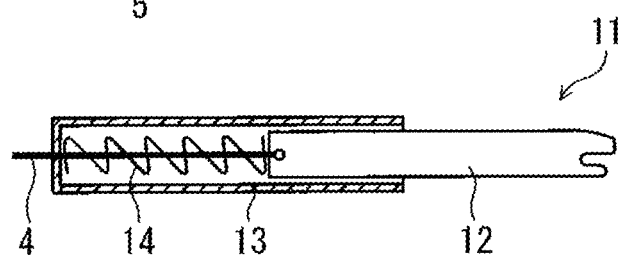
FIG. 1C is a sectional view of the ISOFIX latch with an ISOFIX latch body pulled out of a storage portion.

As shown in FIGS. 1B and 1C, each ISOFIX latch 11 includes an ISOFIX latch body 12, a storage portion 13 capable of storing the ISOFIX latch body 12, and a spring portion 14 that biases the ISOFIX latch body 12 outward. The ISOFIX latch bodies 12 are connected to the anchors of the seat of the passenger car and are fixed with an appropriate length.

Figure 1D:
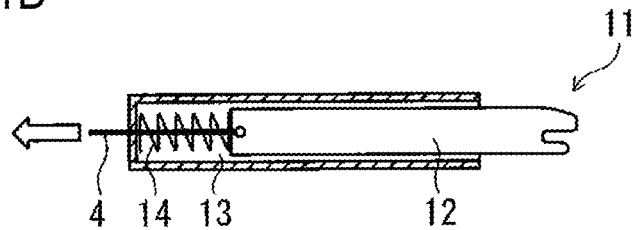
FIG. 1D is a sectional view of the ISOFIX latch with the ISOFIX latch body pushed into the storage portion.

A method for adjusting the positions of the ISOFIX latches 11 by the adjustment mechanism 3 will be described with reference to FIGS. 1C and 1D. First, as shown in FIG. 1C, the ISOFIX latch body 12 of each ISOFIX latch 11 is pulled out of the storage portion 13. The ISOFIX latch body 12 of each ISOFIX latch 11 is then connected to the anchor of the seat of the passenger car, and the car seat 1 is pushed against the seat of the passenger car. The adjustment mechanism body 5 is operated to wind up the string 4. The car seat 1 and the seat of the passenger car can thus be connected with no gap therebetween, and the distance between the car seat 1 and the seat of the passenger car can be finely adjusted.

The following methods are possible to increase the length of the ISOFIX latch bodies 12. One method is to unlock the ISOFIX latches 11, operate the adjustment mechanism body 5, and pull the car seat body away from the seat of the passenger car. Another method is to operate the adjustment mechanism body 5 to automatically increase the length of the ISOFIX latch bodies 12 by the spring portions 14. Still another method is to operate the adjustment mechanism body 5 and pull the ISOFIX bodies 12 with a hand of a user. The length of the ISOFIX latches 11 can thus be adjusted by a simple method.

Adjustment of Length of Shoulder Straps

Figure 2A:
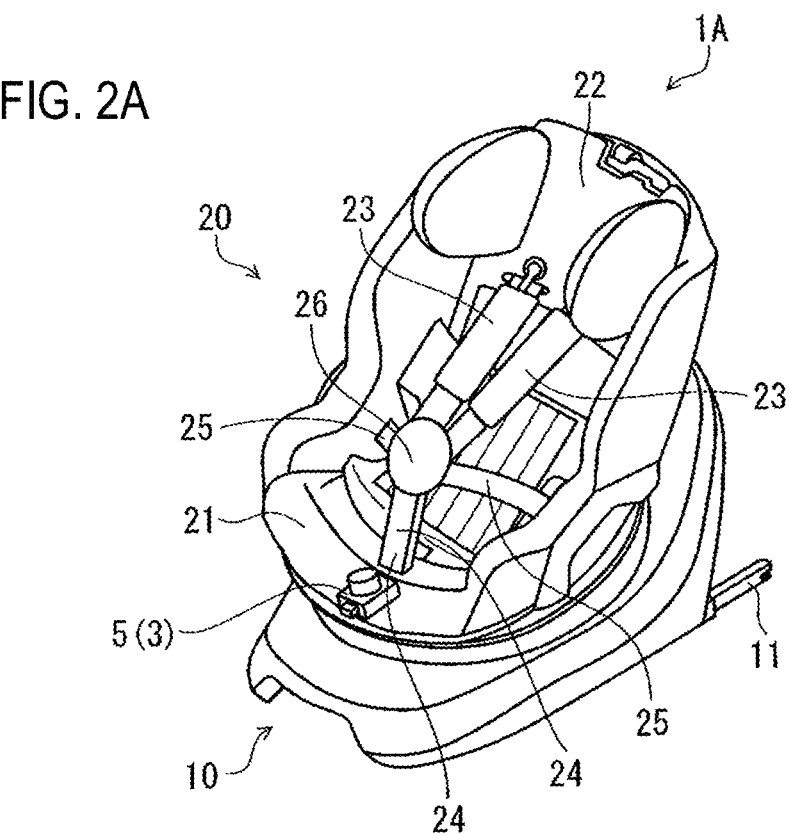
FIG. 2A is a perspective view of a car seat according to another embodiment.
Figure 2B:
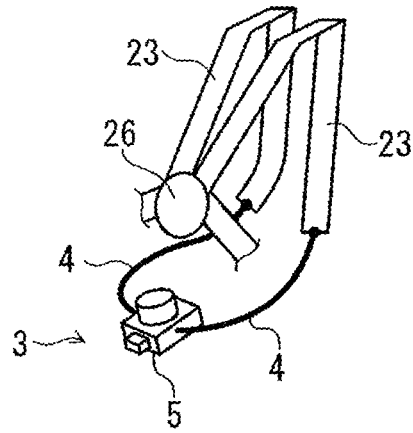
FIG. 2B is a perspective view of an adjustment mechanism, shoulder straps, and waist straps with the shoulder straps pulled out.
Figure 2C:
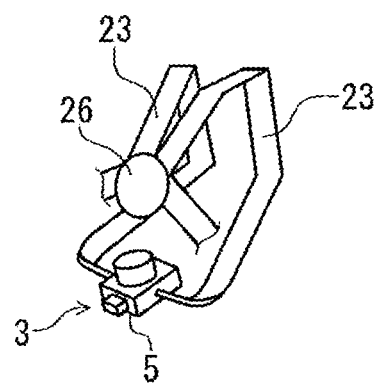
FIG. 2C is a perspective view of the adjustment mechanism, the shoulder straps, and the waist straps with the shoulder straps wound from the state shown in FIG. 2B.

As shown in FIGS. 2A to 2C, the adjustment mechanism 3 of a car seat 1A of another embodiment is used to adjust the length of the shoulder straps 23. As shown in FIG. 2A, the adjustment mechanism 3 is fixed at a front position of the seat portion 21 of the car seat body (seat 20). FIGS. 2B and 2C show only the shoulder straps 23 and adjustment mechanism 3 of the car seat 1 in FIG. 2A.

There is a pair of shoulder straps 23, and the string 4 is fixed to one end of each shoulder strap 23. Namely, there is a pair of strings 4, and the pair of strings 4 is held by the one ends of the pair of shoulder straps 23.

The adjustment mechanism 3 is operated in order to adjust the length of the shoulder straps 23. Specifically, in order to reduce the length of the shoulder straps 23, the shoulder straps 23 are changed from the state shown in FIG. 2B to the state shown in FIG. 2C by operating the adjustment mechanism body 5 to wind up the strings 4. In order to increase the length of the shoulder straps 23, the adjustment mechanism body 5 is operated from the state shown in FIG. 2C and the shoulder straps 23 are pulled out by hand. The shoulder straps 23 can thus be adjusted by a simple method.

The adjustment mechanism body 5 winds up the pair of strings 4 held by the one ends of the pair of shoulder straps 23. However, the adjustment mechanism body 5 may directly wind up the shoulder straps 23.

Flip-Up Mechanisms for Shoulder Straps

Figure 3A:
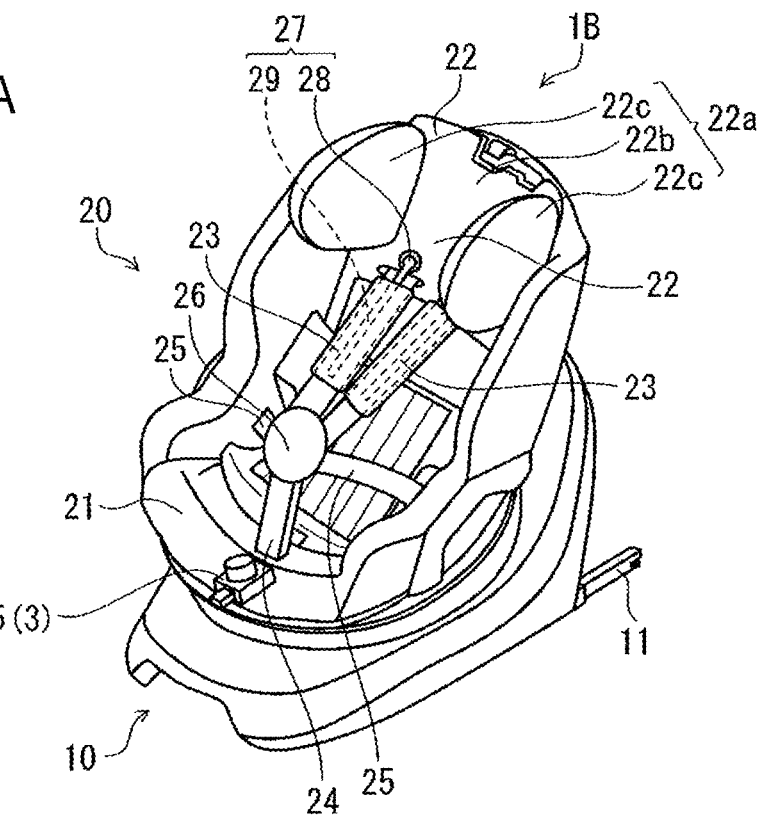
FIG. 3A is a perspective view of a car seat according to still another embodiment.
Figure 3B:
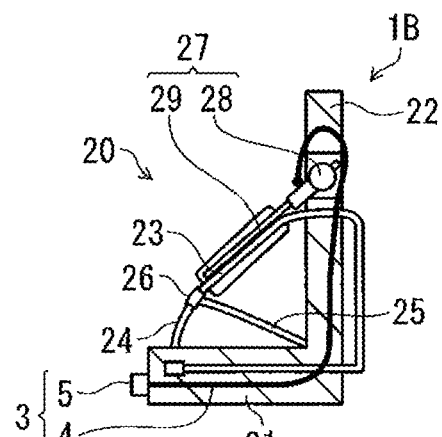
FIG. 3B is a schematic sectional view of the car seat with its straps in a restricting state.
Figure 3C:
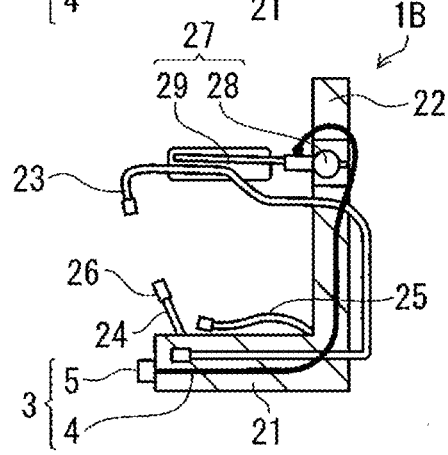
FIG. 3C is a schematic sectional view of the car seat with the straps in a releasing state.

As shown in FIGS. 3A to 3C, the adjustment mechanism 3 of a car seat 1B of still another embodiment is used for flip-up mechanisms 27 for the shoulder straps 23. The flip-up mechanisms 27 for the shoulder straps 23 are a structure that flips up the shoulder strap 23 from a restraining position (FIG. 3B) to a releasing position (FIG. 3C) so that the shoulder belt 23 does not interfere when the child is seated on the car seat 1B.

As shown in FIG. 3B, the flip-up mechanism 27 of the shoulder strap 23 includes a rotating portion 28 and a flip-up portion 29 that is rotatable about the rotating portion 28. As shown in FIG. 3C, when the flip-up portion 29 flips up, the shoulder strap 23 flips up with the flip-up portion 29. As shown in FIG. 3A, the adjustment mechanism 3 is fixed at a front position of the seat portion 21 of the car seat body (seat 20). As shown in FIG. 3B, one end of the string 4 is connected to the rotating portion 28 of the flip-up mechanism 27.

A method for operating the flip-up mechanisms 27 of the shoulder straps 23 by the adjustment mechanism 3 will be described. In order to move the shoulder strap 23 from the restraining position to the releasing position, the shoulder strap 23 is changed from the state shown in FIG. 3B to the state shown in FIG. 3C by operating the adjustment mechanism body 5 to wind up the string 4. In order to move the shoulder strap 23 from the releasing position to the restraining position, the adjustment mechanism body 5 is operated from the state shown in FIG. 3C to press down the shoulder strap 23 and feeds out the string 4. The flip-up mechanism 27 of the shoulder belt 23 can thus be operated by a simple method.

Examples in which the adjustment mechanism 3 is used in the car seats 1, 1A, and 1B are described above. However, the present invention is not limited to the above embodiments. Although the adjustment mechanism 3 of a first embodiment that will be described below is shown in FIGS. 1A to 3C, an adjustment mechanism of any embodiment may be used.

The adjustment mechanism may be used to adjust the length of the crotch strap 24 that restrains the crotch of a child. In this case, one end of the string 4 of the adjustment mechanism is held by one end of the crotch strap 24.

In the case where a headrest 22a that protects the head of a child is an extended portion extending from the body, the adjustment mechanism body 5 may be used to adjust the shape of the headrest 22a. Specifically, adjustment of the shape of the headrest 22a is to adjust the height of the headrest 22a, to adjust the width of a standing wall 22b, or to adjust the distance between a pair of sidewalls 22c. In this case, one end of the string 4 may be connected to a movable portion of the headrest 22a, and the adjustment mechanism body 5 may be fixed to the back of the backrest portion 22 that is a fixed portion.

The adjustment mechanism 3 may be used to adjust the length of the load leg located at the front end of the base body 10. In this case, the string 4 may be connected to one end of the load leg, and the adjustment mechanism body 5 may be fixed to the base body 10 that is a fixed portion.

Baby Carrier

An example in which the nursery equipment is a baby carrier will be described. A basic structure of the baby carrier may be similar to the structure of s typical baby carrier. The baby carrier is a device that allows a user to carry a child on front or back.

The baby carrier includes a baby carrier body, parent shoulder straps to be worn around both shoulders of a user (e.g., parent), and parent waist straps to be worn around the waist of the parent. The baby carrier body is a portion that holds the back or belly of a child and that occupies a large area of the baby carrier. The baby carrier body is a "fixed portion" of the present embodiment, and is also a "body" of the present embodiment. The parent shoulder straps and the parent waist straps are movable portions that extend from the baby carrier body. The parent shoulder straps and the parent waist straps are an "movable portion" of the present embodiment and are also an "extended portion" of the present embodiment. The adjustment mechanism body 5 is provided in order to adjust the length or shape of such shoulder straps or waist straps. In this case, one end of the string 4 may be connected to one end of the shoulder strap or the parent waist strap, and the adjustment mechanism body 5 may be fixed to the back of the baby carrier body that is a fixed portion.

In the case where a headrest that protects the head of a child is an extended portion extending from the baby carrier body (body), the adjustment mechanism body 5 may be used to adjust the height of the headrest according to the child's growth. In this case, one end of the string 4 may be connected to a movable portion of the headrest, and the adjustment mechanism body 5 may be fixed to the back of the baby carrier body that is a fixed portion.

Other Nursery Equipment

The car seat, the stroller, and the baby carrier are described above as examples of the nursery equipment using the adjustment mechanism 3. Other examples of the nursery equipment using the adjustment mechanism 3 include devices in which a child sits or sleeps, such as bassinet and high chair. The above embodiments are merely illustrative, and the present invention is not limited to the above nursery equipment as long as the nursery equipment includes a body and an extended portion extending from the body and the adjustment mechanism serves to adjust the position or shape of the extended portion.

The adjustment mechanism 3 that is used in such nursery equipment will be described in detail.

First Embodiment

The adjustment mechanism 3 according to a first embodiment will be described with reference to FIGS. 4A to 9B. The adjustment mechanism 3 can be attached at various positions on the nursery equipment. In the following description of the first embodiment, the vertical direction in FIGS. 4C, 5, 9A and 9B is the vertical direction of the adjustment mechanism 3, and the lateral direction in FIGS. 4C, 5, 9A and 9B is the lateral direction of the adjustment mechanism 3.

As described above, the adjustment mechanism 3 generally includes the string 4 and the adjustment mechanism body 5. Referring particularly to FIGS. 4A-4C and 5, the adjustment mechanism body 5 includes a holder 30, a rotation operation member 40, a moving member 50, an unlock member 60, a lock member 70, and a reel 80. The adjustment mechanism 3 is configured to wind up the string 4 by the rotation operation member 40 and pull out (feed out) the string 4 by operating the unlock member 60.

For example, the string 4 connects a fixed portion such as car seat body or baby carrier body to a movable portion such as shoulder belts. The string 4 is wound on the reel 80, and is fixed to the fixed portion via the reel 80. There may be one string 4 or a plurality of strings 4. When there are two movable portions, both ends of one string 4 may be connected to the movable portions, and an intermediate portion of the string 4 may be wound on the reel 80. Alternatively, one ends of two strings 4 may be connected to the movable portions, and the other ends of the two strings 4 may be connected to the fixed portion. The reel 80 may be fixed to the movable portion instead of to the fixed portion. In that case, both ends of the string 4 may be connected to the fixed portion, and the distance between the movable portion and the fixed portion may be reduced by winding the string 4 on the reel 80.

The string 4 is a long member. The string 4 means a member produced by braiding, knitting, or sewing up a yarn, thread, chemical fiber, metal, paper, etc., and also includes, for example, a wire and a belt.

Referring to FIGS. 4A-4C and 5, the holder 30 rotatably supports the reel 80. The holder 30 includes an upper holder 31, a lower holder 34, and a partition 37 interposed between the upper holder 31 and the lower holder 34. The upper holder 31 includes an upper surface and a side surface protruding downward from the outer peripheral edge of the upper surface. The upper holder 31 has a through hole 32 substantially in the center of its upper surface. The upper end of the reel 80 extends through the through hole 32. The upper holder 31 further has an operation hole 33 in the side surface. An operation portion 61 of the unlock member 60 extends through the operation hole 33.

The lower holder 34 includes a lower surface and a side surface protruding upward from the outer peripheral edge of the lower surface. The lower holder 34 has a recess 35 in a region surrounded by the lower and side surfaces. The recess 35 holds the reel 80. The lower holder 34 further has string holes 36 in a pair of side surfaces. The string 4 extends through the string holes 36.

The partition 37 has a flat rectangular shape, and has a through hole 38 substantially in its center. The through hole 38 is aligned with the through hole 32 of the upper holder 31 in the vertical direction. The upper end of the reel 80 extend through the through hole 38. The partition 37 further has a plurality of rails in its upper surface. The rails guide the unlock member 60. A protruding portion 39 protruding upward is attached to a part of the outer peripheral edge of the partition 37.

The rotation operation member 40 is a member that operates rotation of the reel 80. The rotation operation member 40 serves as a handle the user can grip and turn. As shown in FIGS. 8A to 8D, the rotation operation member 40 of the present embodiment is in the shape of a knob, and includes an upper surface 41 and a side surface 42 protruding downward from the outer peripheral edge of the upper surface 41. A drive gear portion 43 protruding downward is provided on a back surface 41a of the rotation operation member 40 (the opposite surface 41a of the rotation operation member 40 from the upper surface 41). The rotation operation member 40 may have slits at regular intervals in the side surface 42 in order to make it easier for an operator to use the rotation operation member 40.

A foldable handle may be attached to the rotation operation member 40. The handle is, for example, a rod member and is preferably in such a shape that the handle protrudes upward when in use and is folded to extend along the upper surface 41 or the side surface 42 when not in use.

The moving member 50 is located under the rotation operation member 40. The moving member 50 is a cylindrical shape that opens downward. The moving member 50 includes an upper surface 51 and an outer peripheral edge 52 protruding downward from the outer peripheral edge of the upper surface 51. A driven gear portion 53 protruding upward is provided on the upper surface 51. The driven gear portion 53 engages with the drive gear portion 43 provided on the rotation operation member 40. The outer peripheral edge 52 has a plurality of vertical slits that engages with a link member 57.

Figure 4A:
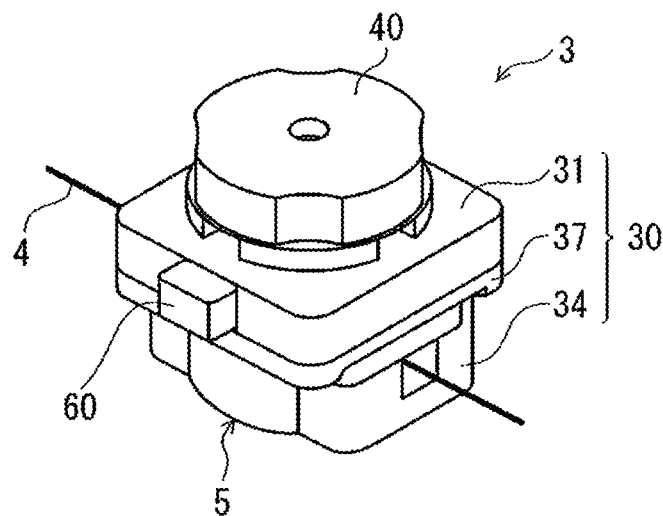
FIGS. 4A to 4C shows an adjustment mechanism according to a first embodiment of the present invention, where
Figure 4B:
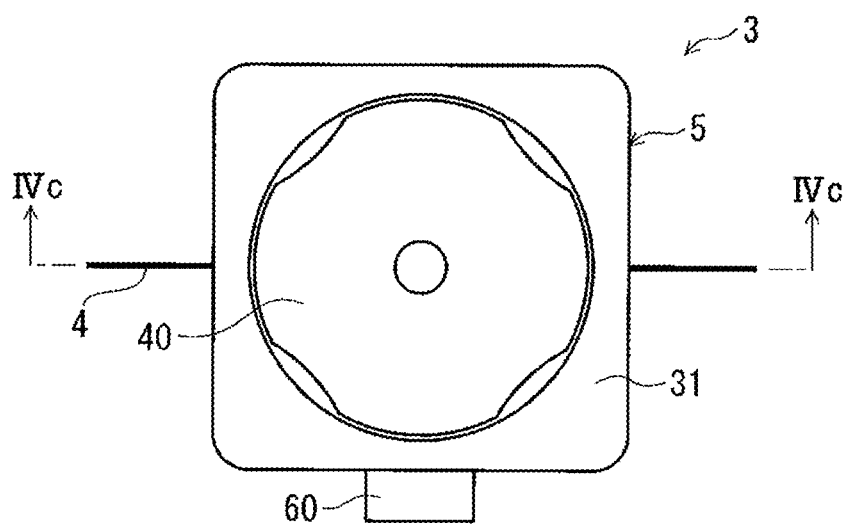
Figure 4C:
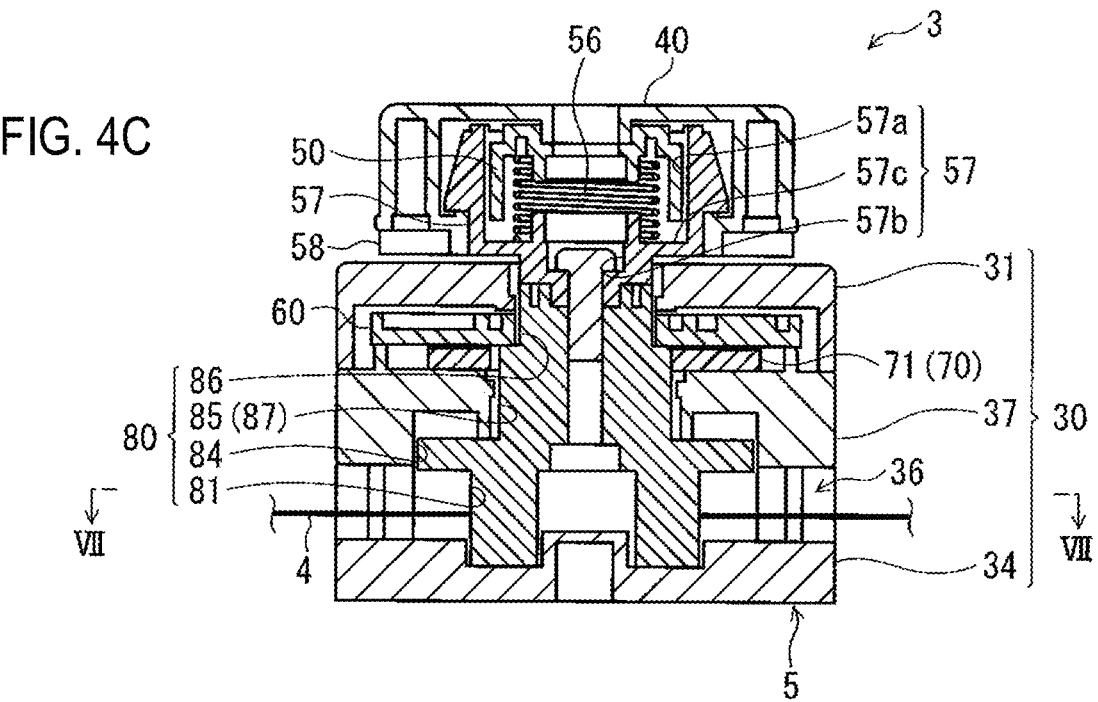

As shown in FIG. 4C, the link member 57 has a cylindrical overall shape, and includes a large diameter portion 57a, a small diameter portion 57b located under the large diameter portion 57a, and a step 57c located between the large diameter portion 57a and the small diameter portion 57b. The small diameter portion 57b is smaller than the through hole 32 of the upper holder 31. The link member 57 is therefore held in the through hole 32 of the upper holder 31 by the step 57c. A ring 58 may be provided between the link member 57 and the upper holder 31. A biasing member 56 is interposed between the moving member 50 and the link member 57. The biasing member 56 is, for example, a spring and biases the moving member 50 in the direction toward the rotation operation member 40.

Figure 5:
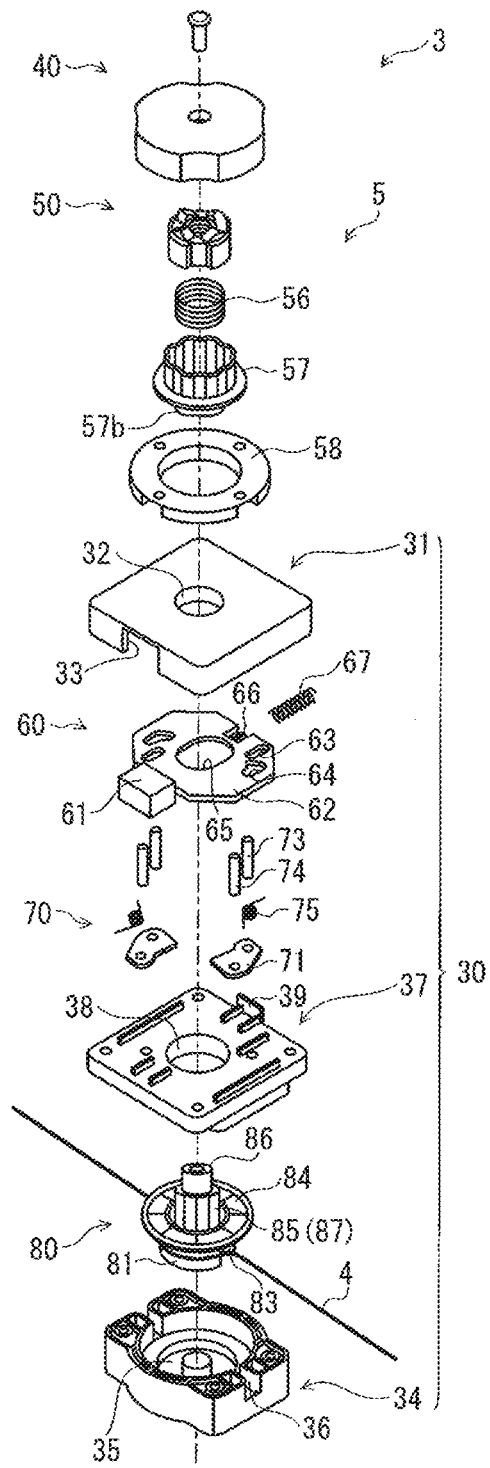
FIG. 5 is an exploded perspective view of the adjustment mechanism according to the first embodiment of the present invention.

The reel 80 is rotatable in both forward and reverse directions (one direction and the other direction). Referring to FIGS. 4C and 5, the reel 80 includes a string holding portion 81, a flange 84, a first connection portion 85, and a second connection portion 86 from bottom to top.

The string holding portion 81 is a portion with the string 4 fixed thereto, and is a portion that winds up and feeds out the string 4. How the string 4 is placed in the string holding portion 81 will be described with reference to FIG. 7. In the following description, T represents the direction in which the string 4 is wound up (hereinafter also referred to as "winding direction"), and S represents the direction in which the string 4 is fed out (hereinafter also referred to as "feeding direction").

The string holding portion 81 includes a fixing portion 81a to which the string 4 is fixed, string extending portions 81b along which the string 4 extends, and rounded portions 81c located between the fixing portion 81a and the string extending portions 81b. The fixing portion 81a is located substantially in the center of the string holding portion 81, and the string 4 is fixed at its middle in the longitudinal direction to the fixing portion 81a. The string 4 fixed to the fixing portion 81a is wound back along the rounded portions 81c and extends along the string extending portions 81b to the outside of the adjustment mechanism body 5 though the string holes 36 of the lower holder 34.

The string extending portions 81b and the rounded portions 81c are located point symmetrically with respect to the fixing portion 81a. The string 4 is thus held in an inverted S shape by the string holding portion 81 as viewed in plan. Since the rounded portions 81c are located at the positions where the string 4 is wound back, the string 4 is smoothly wound around the arc shape of the rounded portions 81c. This configuration prevents the string 4 from being worn by the corners even when the string 4 is pulled and subjected to an excessive load.

Figure 6A:
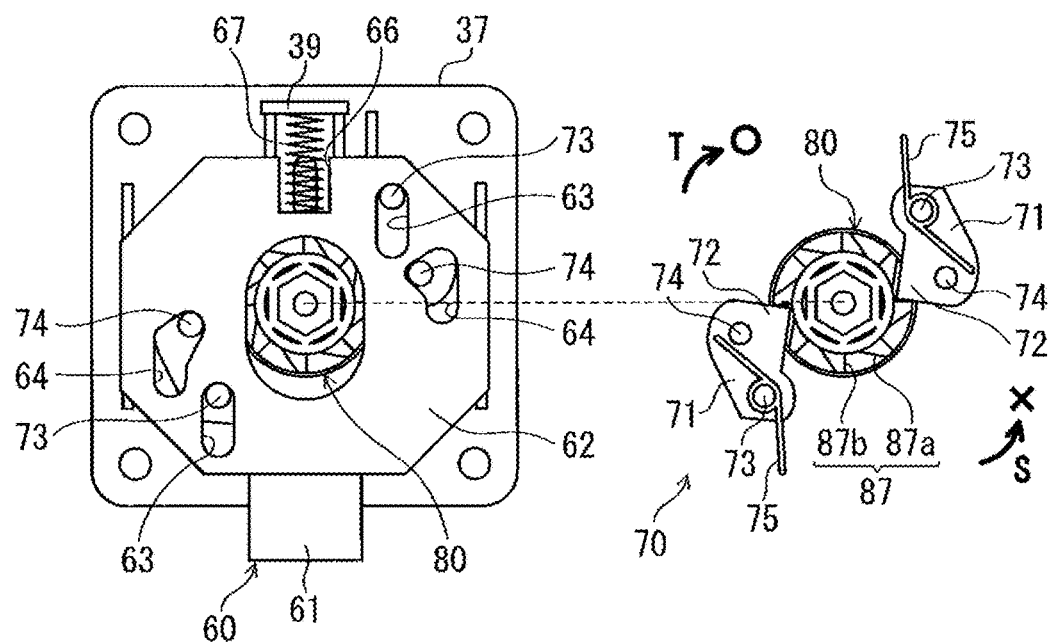
FIGS. 6A to 6B shows plan views of an unlock member, a lock member, a reel, and a partition, where
Figure 6B:
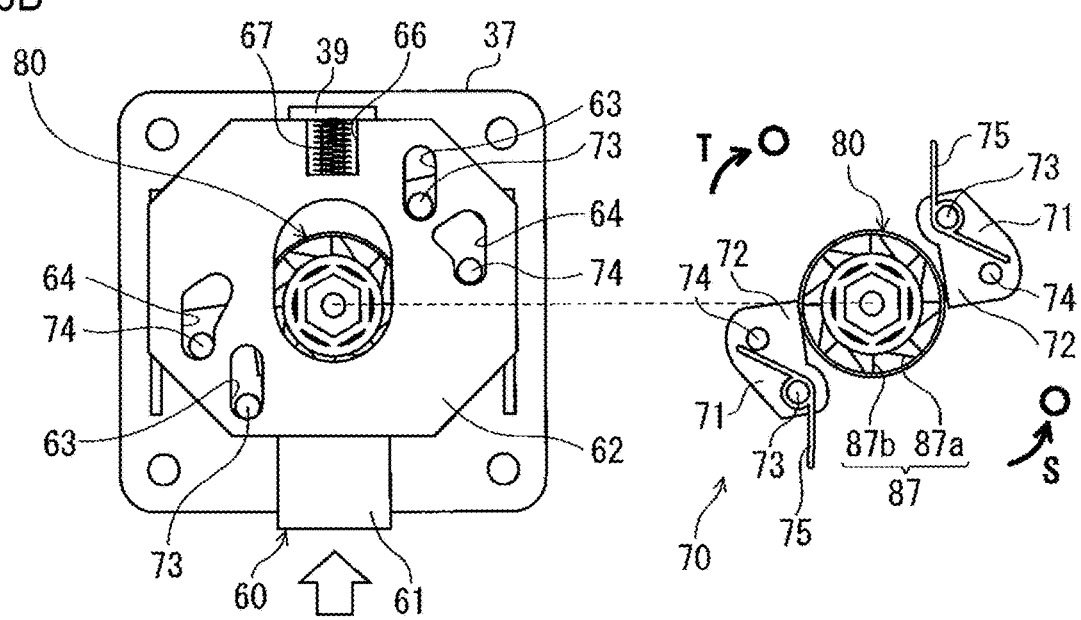
Figure 7:
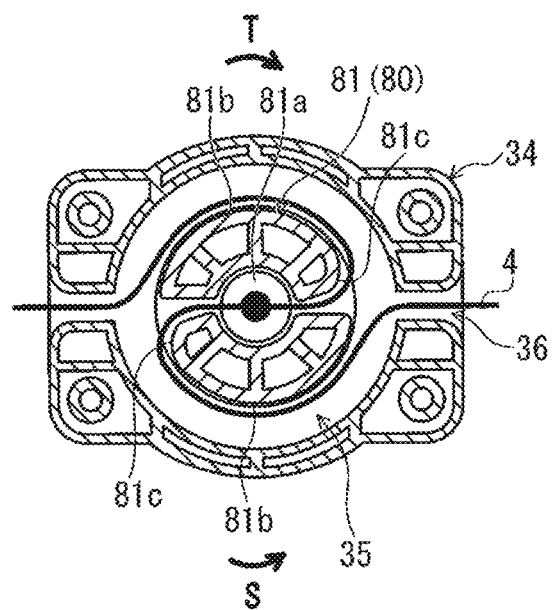
FIG. 7 is a sectional view as viewed from line VII-VII in FIG. 4C.

As shown in FIG. 4C, the flange 84 is located above the string holding portion 81, and is in contact with the lower part of the partition 37. The first connection portion 85 has, for example, a cylindrical shape. The first connection portion 85 has a diameter smaller than that of the through hole 38 of the partition 37, and extends through the through hole 38. As shown in FIGS. 6A and 6B, the first connection portion 85 has engagement teeth 87 on its outer peripheral surface extending parallel to the rotation axis of the reel 80. The second connection portion 86 extends through a through hole 65 of the unlock member 60. The upper end of the second connection portion 86 connects to the small diameter portion 57*b* of the link member 57. The reel 80 is thus fixed to the link member 57, so that the link member 57 rotates with the reel 80 when the reel 80 rotates. The reel 80 and the link member 57 may be a single-piece member.

As shown in FIGS. 5, 6A, and 6B, the lock member 70 includes a pair of lock bodies 71, engagement pawls 72, first pins 73, second pins 74, and biasing portions 75. The engagement pawls 72 are provided on the lock bodies 71. The first and second pins 73, 74 extend through holes of the rock bodies 71. The biasing portions 75 bias the rock bodies 71.

Each rock body 71 is movable between a lock position (FIG. 6A) where the engagement pawls 72 engage with the engagement teeth 87 and an unlock position (FIG. 6B) where the engagement pawls 72 do not engage with the engagement teeth 87. Each engagement pawl 72 is formed at the end of the corresponding lock body 71 that faces the reel 80. As shown in FIG. 5, each lock body 71 has two pin holes through which the first and second pins 73, 74 extend. This motion of the rock bodies 71 is performed by the unlock member 60 sliding up and down.

As shown in FIGS. 6A and 6B, the engagement pawls 72 move in a direction perpendicular to the engagement teeth 87 of the reel 80 and engage with the engagement teeth 87 of the reel 80. The angle of the engagement pawls 72 is preferably a right angle, but may be an acute angle. The engagement pawls 72 are movable between a first position and a second position. At the first position, the engagement pawls 72 engage with the engagement teeth 87 that rotate with the reel 80, and prohibit rotation of the reel 80. At the second position, the engagement pawls 72 disengage from the portion that rotates with the reel 80, and allows rotation of the reel 80. The first pins 73 fix the biasing portions 75, and extend through first holes 63 of the unlock member 60. The first pins 73 serves as guides for the unlock member 60 and as pivot points about which the rock bodies 71 rotate. The second pins 74 extend through second holes 64 of the unlock member 60. The biasing portions 75 are, for example, torsion springs, and bias the lock bodies 71 in such a direction that the engagement pawls 72 of the lock body 71 engage with the engagement teeth 87 of the reel 80 (toward the lock position). The engagement pawls 72 of the lock member 70 and the engagement teeth 87 of the reel 80 are a "rotation lock mechanism" that prohibits rotation of the reel 80.

The unlock member 60 unlocks the reel 80 from the rotation prohibited state to allow the reel 80 to rotate freely. That is, the string 4 wound on the reel 80 can be pulled out by operating the unlock member 60. FIG. 6A shows the state in which the unlock member 60 is not operated. In this state, the string 4 can be wound on the reel 80 but cannot be fed out of the reel 80. FIG. 6B shows the state in which the unlock member 60 is operated. In this state, the string 4 can be fed out of the reel 80. By moving the unlock member 60 in a direction perpendicular to the rotation axis of the reel 80, the unlock member 60 unlocks the reel 80 from the rotation prohibited state.

As shown in FIGS. 6A and 6B, the unlock member 60 includes the operation portion 61, an unlock body 62, the first and second holes 63, 64, the through hole 65, a recess 66, and a biasing portion 67. The unlock body 62 slides as the operation portion 61 is operated. The first and second holes 63, 64, the through hole 65, and the recess 66 are formed in the unlock body 62. Since the unlock member 60 is provided separately from other members, the unlock member 60 can have various shapes, and the position of the unlock member 60 is not limited. Therefore, the unlock member 60 can be designed with flexibility.

The operation portion 61 is operated so as to move the engagement pawls 72 of the lock member 70 to the disengaged position. As shown in FIG. 5, the operation portion 61 protrudes outward from the operation hole 33 of the upper holder 31 so that the operation portion 61 can be pressed inward. The unlock member 60 is in the shape of a plate, and the first and second holes 63, 64 are holes extending through the unlock member 61 in the vertical direction. Specifically, the first holes 63 are long holes extending in the direction in which the operation portion 61 is operated. The second holes 64 are substantially in an inverted L shape. The first and second holes 63, 64 are located point symmetrically. That is, the first and second holes 63, 64 are located in the upper right and lower left portions of the unlock member 60 in FIG. 6A.

The through hole 65 is located substantially in the center of the unlock member 60, and the upper end of the reel 80 extends through the through hole 65. The recess 66 holds the biasing portion 67. The biasing portion 67 is, for example, a coil spring. The biasing portion 67 is located between the protruding portion 39 of the partition 37 and the recess 66. The unlock member 60 is thus biased to the state of FIG. 6A by the biasing portion 67. The biasing portion 67 is a separate member from the unlock member 60. However, the biasing portion 67 may be integral with the unlock body 62, or may be provided on the side surface of the upper holder 31.

One-Way Clutch Mechanism

A one-way clutch mechanism will be described with reference to FIGS. 6A and 6B. The one-way clutch mechanism is a mechanism that allows rotation of the reel 80 in the direction in which the string 4 is wound, and prohibits rotation of the reel 80 in the direction in which the string 4 is fed out. The one-way clutch mechanism is a mechanism that rotates easily in one direction but does not rotate in the other direction or does not rotate unless a certain load is applied. In the present embodiment, in FIG. 6A, the reel 80 rotates in the direction T in which the reel 80 winds up the string 4 (clockwise), but does not rotate in the direction S in which the reel 80 fees out the string 4 (counterclockwise).

The one-way clutch mechanism of the present embodiment includes the engagement teeth 87 provided on the reel 80 and the engagement teeth 72 that are attached to the partition 37 and that are movable between the engaged position (FIG. 6A) where the engagement teeth 72 engage with the reel 80 and the disengaged position (FIG. 6B) where the engagement teeth 72 do not engage with the reel 80.

Each engagement tooth 87 of the reel 80 includes a first tilted portion 87*a* and a second tilted portion 87*b*. The angle between the first tilted portion 87*a* and the second tilted portion 87*b* is preferably a right angle so as to conform to the shape of the engagement pawls 72 of the lock member 70. The engagement teeth 87 of the reel 80 and the engagement pawls 72 of the lock member 70 are not limited to the illustrated shape, and may have any shape like the shape of a typical one-way clutch as long as the engagement teeth 87 and the engagement pawls 72 mesh with each other.

Since the one-way clutch mechanism of the present embodiment is provided, the reel 80 rotates only in the winding direction T, and does not rotate in the feeding direction S. Accordingly, the string 4 is wound to the reel 80 by rotating the rotation operation member 40 and is fed out of the reel 80 by operating the unlock member 70 and pulling the string 4. This configuration prevents or reduces erroneous operations. Since the string 4 cannot be fed out of the reel 80 by rotating the rotation operation member 40, the string 4 will not be fed out of the reel 80 even if the rotation operation member 40 is operated by mistake. This configuration improves safety.

The one-way clutch mechanism of the present embodiment completely prohibits rotation in the direction in which the string 4 is fed out. However, the one-way clutch mechanism may prohibit a certain amount of rotation. The one-way clutch mechanism of the present embodiment may have a motion transmission portion and a motion separation portion like the drive gear portion 43 and the driven gear portion 53 that will be described below. From a safety point of view, such a one-way clutch mechanism is preferably used to adjust the position or shape of a portion that is not subjected to a load.

Motion Transmission Portion and Motion Separation Portion

The motion transmission portion and the motion separation portion that are provided on the rotation operation member 40 and the moving member 50 will be described with reference to FIGS. 8A to 9B.

Figure 8A:
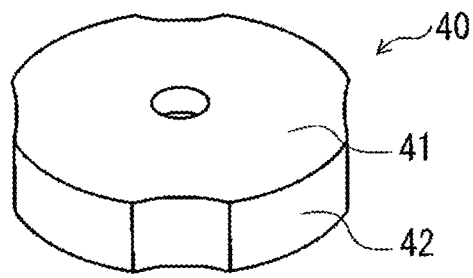
FIG. 8A is a perspective view of a rotation operation member and a moving member.
Figure 8B:
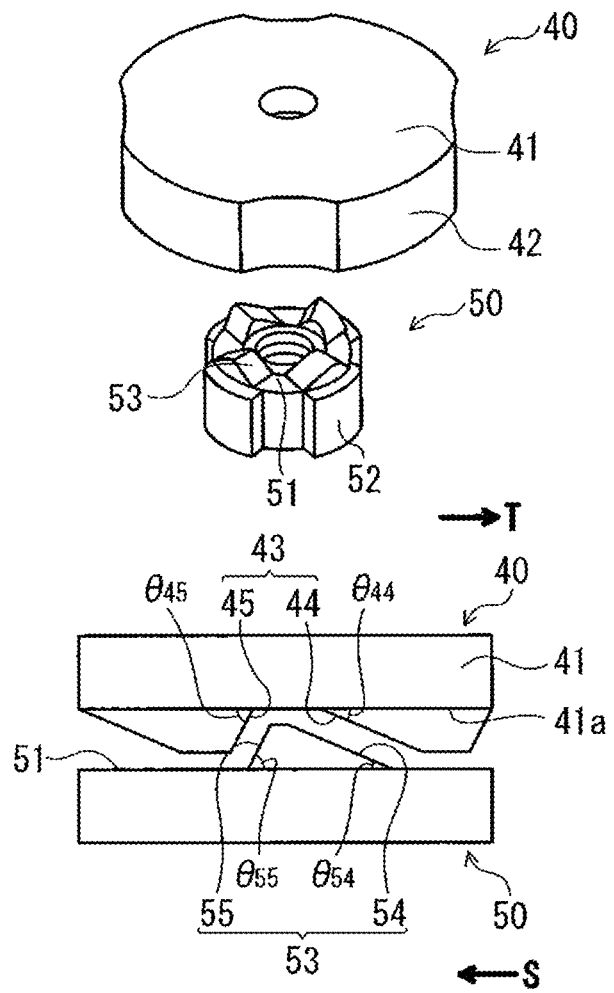
FIG. 8B is a schematic view of a drive gear of the rotation operation member and a driven gear of the moving member.
Figure 8C:
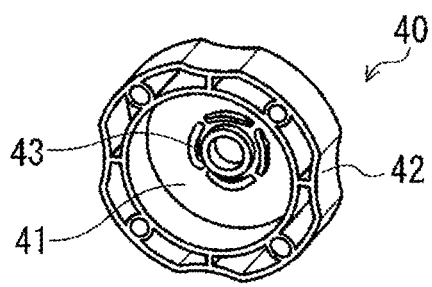
FIG. 8C is a perspective view of the rotation operation member as viewed from the back.
Figure 8D:
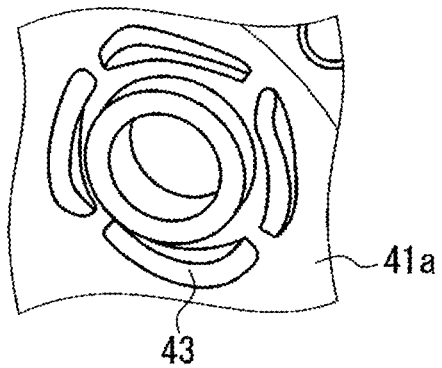
FIG. 8D is an enlarged view of the drive gear portion in FIG. 8C.

As shown in FIGS. 8C and 8D, the drive gear portion 43 is provided on the back surface 41a of the rotation operation member 40. As shown in FIG. 8B, the drive gear portion 43 includes a first tilted portion 44 and a second tilted portion 45. The first tilted portion 44 is tilted in the feeding direction S from the moving member 50 side toward the back surface 41a of the rotation operation member 40. The second tilted portion 45 is tilted in the winding direction T from the moving member 50 side toward the back surface 41a of the rotation operation member 40. Both the angle $\theta_{44}$ between the back surface 41a and the first tilted portion 44 and the angle $\theta_{45}$ between the back surface 41a and the second tilted portion 45 are acute angles, but the angle $\theta_{45}$ is larger than the angle $\theta_{44}$ ($\theta_{45} > \theta_{44}$).

As shown in FIG. 8A, the driven gear portion 53 is provided on the upper surface 51 of the moving member 50. As shown in FIG. 8B, the driven gear portion 53 includes a first tilted portion 54 and a second tilted portions 55. The first tilted portion 54 is tilted in the winding direction T from the rotation operation member 40 side toward the upper surface 51 of the moving member 50. The second tilted portion 55 is tilted in the feeding direction S from the upper surface 51 of the moving member 50 toward the back surface 41a of the rotation operation member 40. Both the angle $\theta_{54}$ between the upper surface 51 and the first tilted portion 54 and the angle $\theta_{45}$ between the upper surface 51 and the second tilted portion 55 are acute angles, but the angle $\theta_{55}$ is larger than the angle $\theta_{54}$ ($\theta_{55} > \theta_{54}$). In the present embodiment, $\theta_{44} \approx \theta_{54}$ and $\theta_{45} \approx \theta_{55}$, so that the drive gear portion 43 and the driven gear portion 53 securely mesh with each other.

Figure 9A:
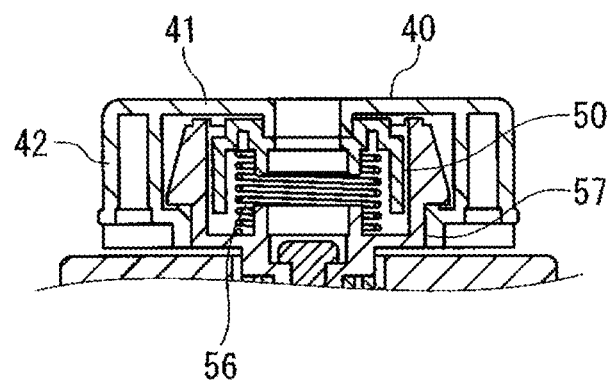
FIGS. 9A to 9B shows sectional views of the rotation operation member, the moving member, and a link member, where

When the rotation operation member 40 is rotated in the winding direction T, the second tilted portion 45 of the drive gear portion 43 and the second tilted portion 55 of the moving member 50 that have a large tilt angle mesh with each other, and the moving member 50 (reel 80) rotates with the rotation operation member 40. The moving member 50 (reel 80) rotating with the rotation operation member 40 is shown in FIG. 9A.

Figure 9B:
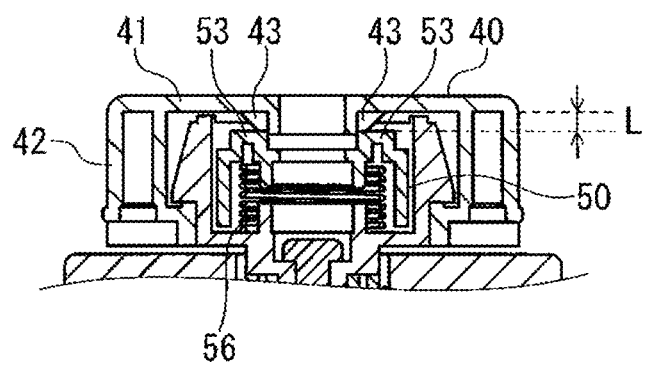

When the string 4 finishes being wound, the moving member (reel 80) cannot rotate any more, and therefore a certain load or more (high torque) is applied to the meshing portion between the second tilted portion 45 of the drive gear portion 43 and the second tilted portion 55 of the moving member 50. When the rotation operation member 40 is rotated in this state, the drive gear portion 43 gets over the driven gear portion 53, and only the rotation operation member 40 rotates. That is, when a certain load or more is applied to the rotation operation member 40, the rotational motion of the rotation operation member 40 will not be transmitted to the reel 80. This state is shown in FIG. 9B. As shown in FIG. 9B, the drive gear portion 43 gets over the driven gear portion 53, and the moving member 50 moves downward by a dimension L. When a certain load or more is applied to the rotation operation member 40, the moving member 50 repeatedly moves up and down while the rotation operation member 40 rotates without engagement.

That is, the second tilted portion 45 of the drive gear portion 43 and the second tilted portion 55 of the moving member 50 normally serve as the "motion transmission portion" that transmits the rotational motion of the rotation operation member 40 to the reel 80. When a certain load or more is applied to the rotation operation member 40, the second tilted portion 45 of the drive gear portion 43 and the second tilted portion 55 of the moving member 50 serve as the "motion separation portion" that does not transmit the rotational motion of the rotation operation member 40 to the reel 80.

For improved operability, the rotation operation member 40 has a one-way clutch structure that does not allow the string 4 to be pulled out. When the rotation operation member 40 is rotated in the feeding direction S, the first tilted portion 44 of the drive gear portion 43 and the first tilted portion 54 of the moving member 50 mesh with each other. However, due to the one-way clutch mechanism that does not allow the reel 80 to rotate in the feeding direction S (FIG. 6A), the drive gear portion 43 of the rotation operation member 40 gets over the driven gear portion 53 of the moving member 50 and the rotation operation member 40 rotates without engagement. That is, when a certain load or more is applied to the rotation operation member 40, the rotational motion of the rotation operation member 40 will not be transmitted to the reel 80.

The adjustment mechanism 3 of the present embodiment includes the motion transmission portion and the motion separation portion, and the rotation operation member 40 is configured to rotate without engagement when the rotation operation member 40 is rotated in the feeding direction S. Operability is thus improved. The rotation operation member 40 is also configured to rotate without engagement when the rotation operation member 40 is further rotated in the winding direction T after the string 4 finishes being wound. This configuration prevents the string 4 from being pulled hard, and can also be used as an indication of the winding condition of the string 4.

In the above embodiment, the drive gear portion 43 is provided on the back surface 41a of the rotation operation member 40 (the opposite surface 41a of the rotation operation member 40 from the upper surface 41), and the driven gear portion 53 is provided on the upper surface 51 of the moving member 50. However, the driven gear portion 53 may be provided in a direction perpendicular to the rotation axis of the reel 80 (lateral direction). A specific example of such a configuration includes a configuration in which the drive gear portion 43 is provided on the inner side surface of the rotation operation member 40 (the opposite surface of the rotation operation member 40 from the side surface 42) and the driven gear portion 53 is provided on the moving member 50. With this configuration, when the rotation operation member 40 is rotated and a certain load or more is applied to the rotation operation member 40, the moving member 50 repeatedly moves in the horizontal direction (lateral direction) while the rotation operation member 40 rotates without engagement.

The biasing member 56 for biasing the moving member 50 in the direction toward the rotation operation member 40 is provided in the embodiment. However, for example, a resin spring may be formed integrally with a member with the driven gear portion 53.

Operation

The operation of the adjustment mechanism 3 of the first embodiment will be described. The rotation operation member 40 is rotated when winding up the string 4, and the operation portion 61 of the unlock member 60 is pressed and the string 4 is pulled when feeding out the string 4.

Specifically, when winding up the string 4, the rotation operation member 40 is rotated in the winding direction T (clockwise) as shown in FIG. 6A. Due to the one-way clutch mechanism, the engagement pawls 72 of the lock member 70 repeats the motion of getting over the first tilted portion 87a of one engagement tooth 87 of the reel 80 and engaging with the next engagement tooth 87 of the reel 80, so that the reel 80 also rotates clockwise and winds up the string 4.

When feeding out the string 4, the operation portion 61 of the unlock member 60 is pressed toward the holder 30 as shown in FIG. 6B. The unlock body 62 thus slides upward in FIG. 6B. As a result, the second pins 74 extending through the second holes 64 of the unlock body 62 move and the lock member 70 move accordingly, so that the engagement pawls 72 of the lock member 70 are disengaged from the engagement teeth 87 of the reel 80. The reel 80 thus becomes rotatable, and the string 4 can be fed out by pulling the string 4.

First Modification

Figure 10:
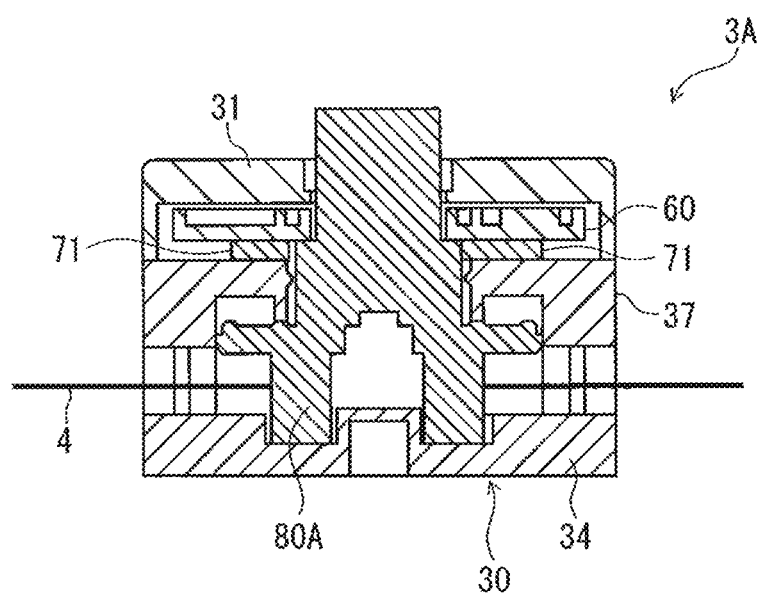
FIG. 10 is a sectional view of a modification of the adjustment mechanism.

An adjustment mechanism 3A in a first modification will be described with reference to FIG. 10. A reel 80A of the adjustment mechanism 3A in the first modification is a member in which the rotation operation member 40, the moving member 50, the link member 57, and the reel 80 of the above embodiment are formed integrally. Since the rotation operation member 40, the moving member 50, and the link member 57 are not required for the adjustment mechanism 3A in the first modification, the number of parts is reduced and the configuration is simplified. In the first modification, the motion transmission portion and the motion separation portion are not provided because the rotation operation member 40 and the moving member 50 are formed integrally.

Second Modification

Figure 11A:
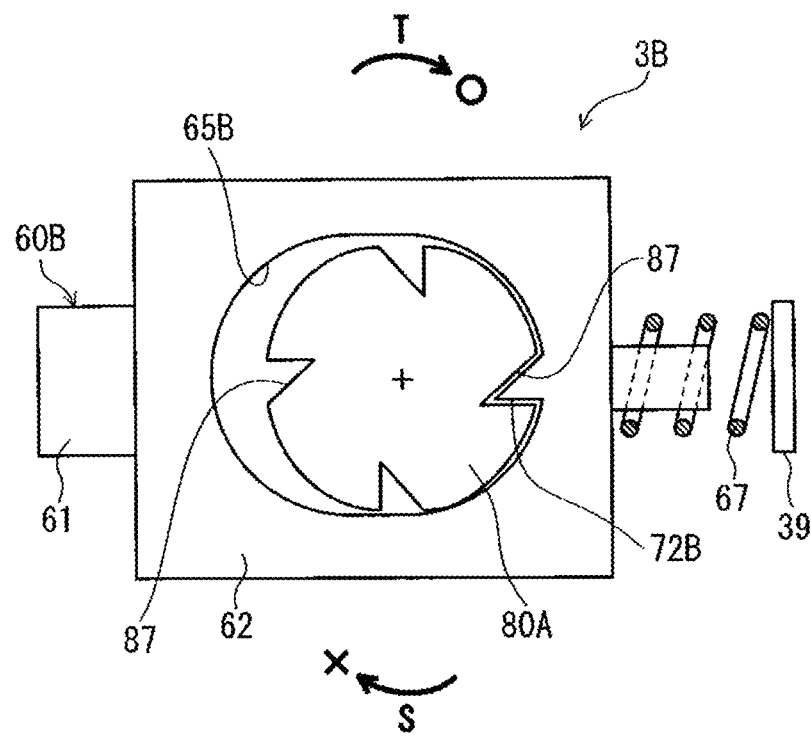
FIGS. 11A to 11B shows schematic views of another modification of the adjustment mechanism, where
Figure 11B:
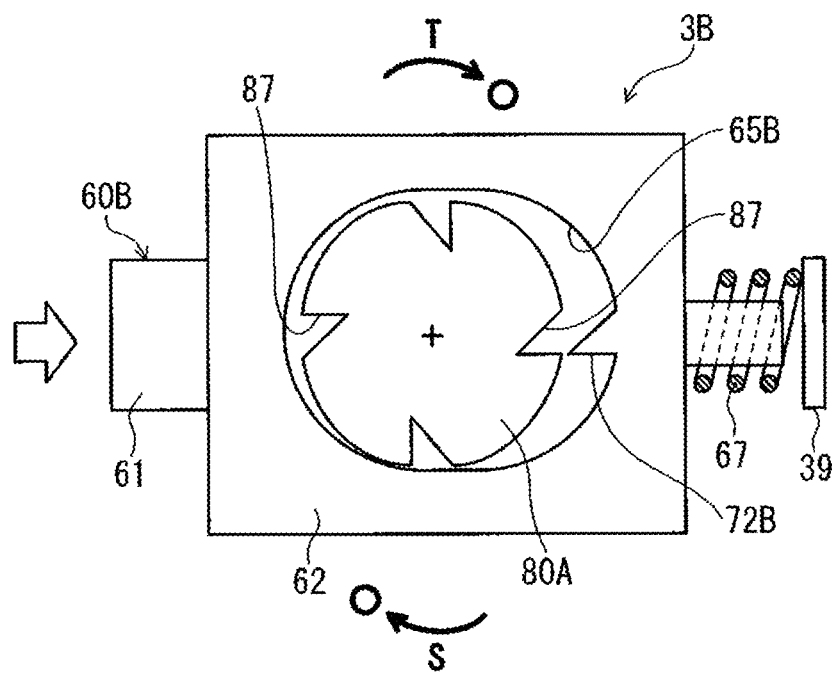

An adjustment mechanism 3B in a second modification will be described with reference to FIGS. 11A and 11B. FIG. 11A shows the state in which the unlock member 60 is not operated, and FIG. 11B shows the state in which the unlock member 60 is operated.

The engagement pawl 72 of the adjustment mechanism 3B in the second modification may be provided on the unlock member 60 of the above embodiment. Specifically, an engagement pawl 72 may be provided on the outer peripheral edge of a through hole 65B of an unlock member 60B so as to protrude inward in the through hole 65B. By pressing the operation portion 61 of the unlock member 60B, the engagement tooth 87 of the reel 80 is disengaged from the engagement pawl 72, and the reel 80 is unlocked from the rotation prohibited state. Since the lock member 70 is not required for the adjustment mechanism 3B in the third modification, the number of parts is reduced and the configuration is simplified.

Second Embodiment

Figure 12A:
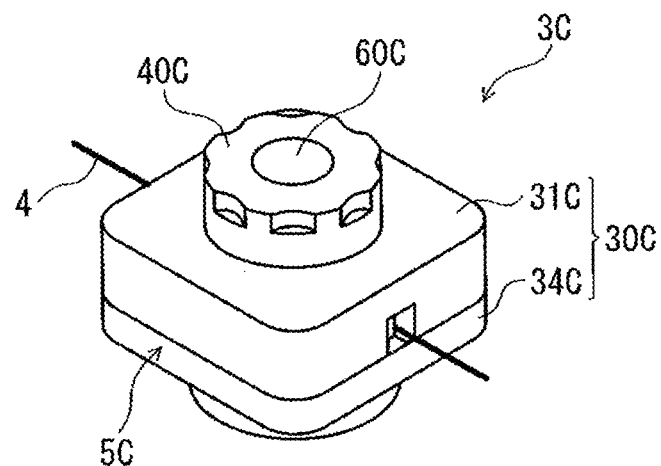
FIGS. 12A to 12C shows an adjustment mechanism in a second embodiment of the present invention, where
Figure 12B:
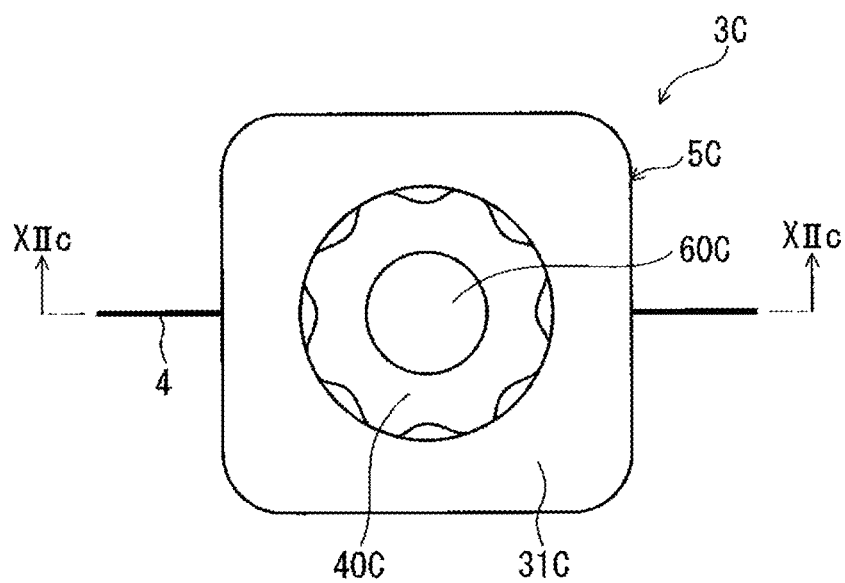
Figure 12C:
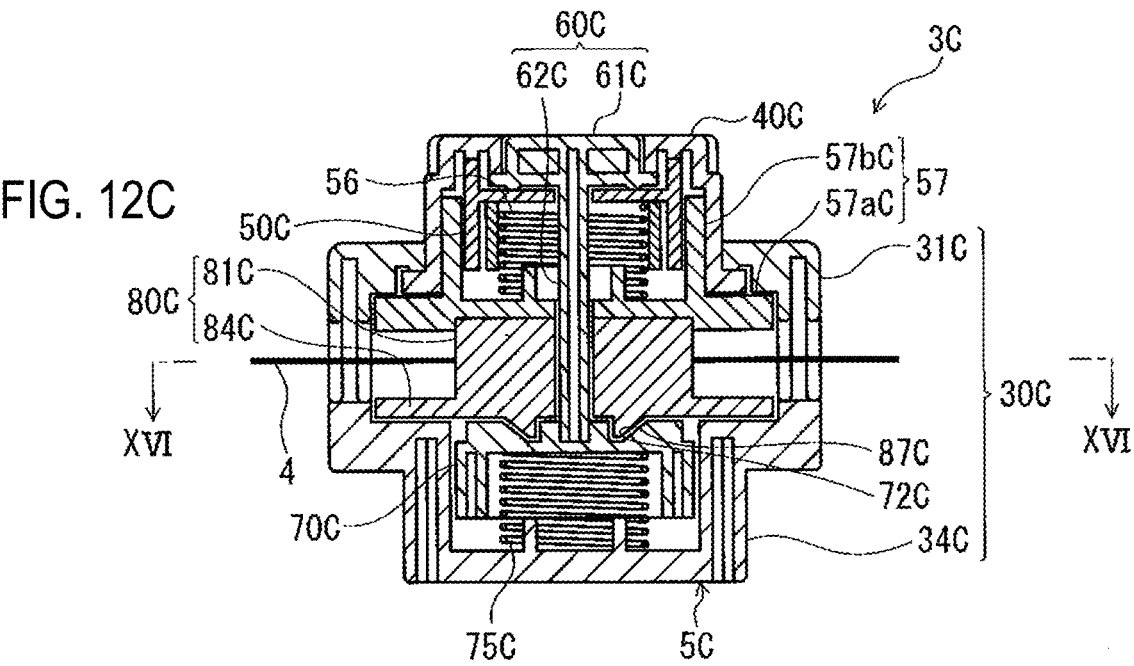
Figure 13:
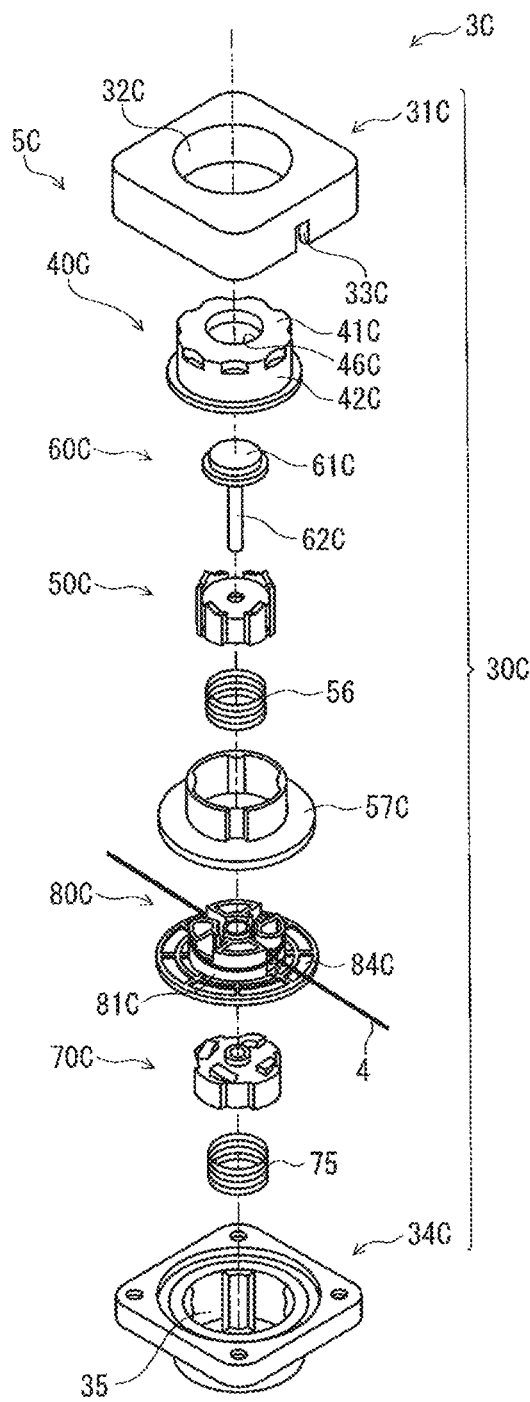
FIG. 13 is an exploded perspective view of the adjustment mechanism in the second embodiment of the present invention.

An adjustment mechanism 3C in a second embodiment will be described with reference to FIGS. 12A to 18B. Only the differences from the adjustment mechanism 3 in the first embodiment will be described in detail. The second embodiment is generally different from the first embodiment in an unlock member 60C and the one-way lock mechanism. The adjustment mechanism 3 can be attached at various positions on the nursery equipment. In the following description, the upward direction in FIGS. 12C and 13 is the upward direction of the adjustment mechanism 3C, and the downward direction in FIGS. 12C and 13 is the downward direction of the adjustment mechanism 3C.

The adjustment mechanism 3C generally includes the string 4 and an adjustment mechanism body 5C. Referring particularly to FIGS. 12A-12C and 13, the adjustment mechanism body 5C includes a holder 30C, a rotation operation member 40C, a moving member 50C, an unlock member 60C, a lock member 70C, and a reel 80C. The adjustment mechanism 3C is configured to wind up the string 4 by the rotation operation member 40C and pull out (feed out) the string 4 by operating the unlock member 60C.

The holder 30C includes an upper holder 31C and a lower holder 34C. The upper holder 31C has a through hole 32C substantially in the center of its upper surface. The rotation operation member 40C extends through the through hole 32C. The upper holder 31 has holes 33C in its side surfaces. The string 4 extends through the holes 33C. The lower holder 34C has a recess 35 substantially in its center. The recess 35 holds the lock member 70C.

Figure 17A:
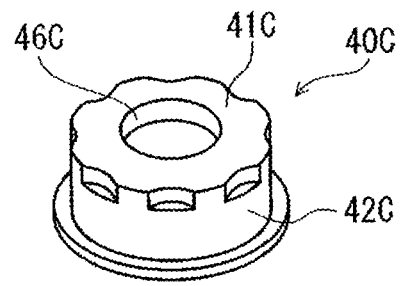
FIG. 17A is a perspective view of a rotation operation member and a moving member.
Figure 17A:
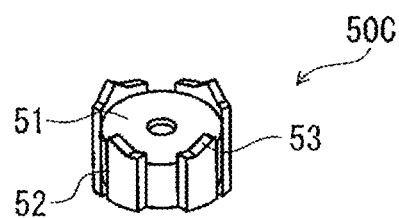

The rotation operation member 40C is a member for controlling rotation of the reel 80C. The rotation operation member 40C has cuts at regular intervals along the corner between an upper surface 41C and a side surface 42C so that an operator can easily use the rotation operation member 40C. The rotation operation member 40C further has a through hole 46C substantially in the center of its upper surface 41C. The unlock member 60C extends through the through hole 46C. As shown in FIGS. 17C and 17D, the drive gear portion 43 protruding downward is provided on the back surface of the rotation operation member 40C (the opposite surface of the rotation operation member 40C from the upper surface 41C).

As shown in FIG. 13, the moving member 50C is located below the rotation operation member 40C. The moving member 50C has a hole in its upper surface 51C. An unlock body 62C of the unlock member 60C extends through the hole. The driven gear portion 53 standing upward is provided along the outer peripheral edge 52 of the moving member 50C. The driven gear portion 43 engages with the drive gear portion 43 of the rotation operation member 40C.

As shown in FIG. 12C, a link member 57C includes a bottom portion 57aC and a side portion 57bC standing upward from the bottom portion 57aC. The biasing member 56 is interposed between the moving member 50C and the link member 57C. The biasing member 56 is, for example, a spring, and biases the moving member 50C in the direction toward the rotation operation member 40C.

The reel 80C includes a string holding portion 81C and a flange 84C. The string holding portion 81C is located on the upper side of the flange 84C. How the string 4 is placed in the string holding portion 81C will be described with reference to FIG. 16. The string holding portion 81C of the present embodiment is different from the string holding portion 81 of the first embodiment in where the string 4 is held. The string 4 of the first embodiment was fixed at one position, namely by the fixing portion 81a located substantially at the center of the string holding portion 81 as viewed in plan. However, the string 4 of the present embodiment is fixed at two positions, namely by two fixing portions 81aC located above and below substantially the center of the string holding portion 81C as viewed in plan in FIG. 16. The fixed portions 81aC are cuts and have such a shape that the fixed portions 81aC can hold the ends of the string 4. In the present embodiment, two strings 4 are provided instead of one string.

As shown in FIG. 12C, the flange 84C extends in a direction perpendicular to the rotation axis and is in contact with the top of the lower holder 34C. As shown in FIG. 15C, engagement teeth 87C are provided on the back surface of the flange 84C.

Figure 14A:
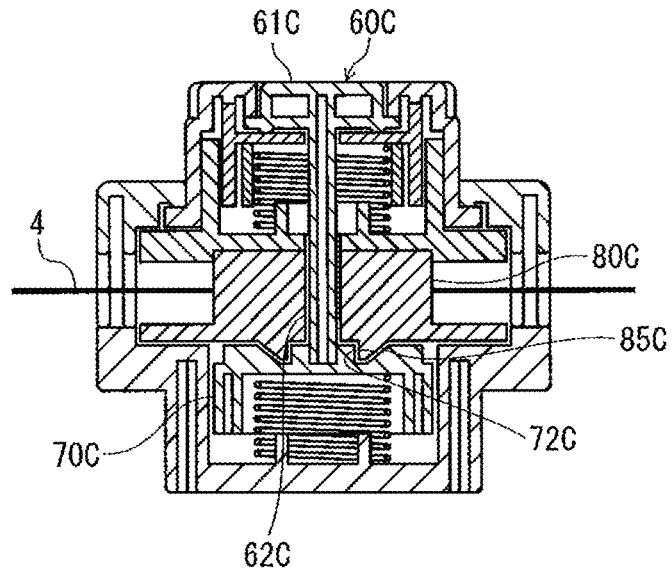
FIGS. 14A to 14B shows sectional views of the adjustment mechanism in the second embodiment of the present invention, where FIG. 14A indicates the state in which an unlock member is not operated.
Figure 14B:
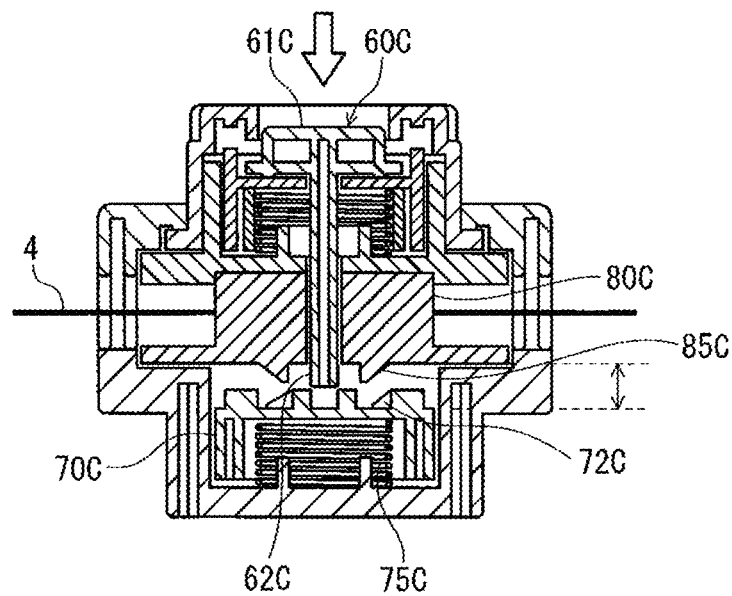
Figure 15A:
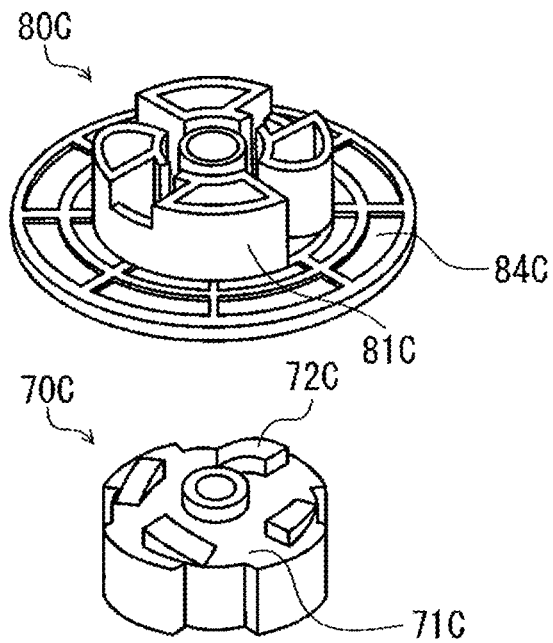
FIG. 15A is a perspective view of a reel and a lock member.

As shown in FIGS. 12C and 15A, the lock member 70C includes a lock body 71C, engagement pawls 72C provided on the upper surface of the lock body 71C, and a biasing member 75C for biasing the lock body 71C. The lock body 71C is movable between an engaged position where the engagement pawls 72C engage with the engagement teeth 87C (FIG. 14A) and a disengaged position where the engagement pawls 72C engage with the engagement teeth 87C (FIG. 14B). The engagement teeth 87C are provided on the lower surface of the reel 80C that extends in a direction perpendicular to the rotation axis of the reel 80C. The engagement pawls 72C of the lock member 70C and the engagement teeth 87C of the reel 80C are a "rotation lock mechanism" that prohibits rotation of the reel 80C.

The unlock member 60C unlocks the reel 80C from the rotation prohibited state to allow the reel 80C to rotate freely. That is, by operating the unlock member 60C, the string 4 wound on the reel 80C can be pulled out. FIG. 14A shows the state in which the unlock member 60C is not operated. In this state, the string 4 can be wound on the reel 80C but cannot be fed out of the reel 80C. FIG. 14B shows the state in which the unlock member 60C is operated. In this state, the string 4 can be fed out from the reel 80C. The unlock member 60C moves in a direction parallel to the rotation axis of the reel 80C to unlock the reel 80C from the rotation prohibited state.

Referring to FIGS. 14A and 14B, the unlock member 60C includes an operation portion 61C to be operated by the user, and an unlock body 62C in a rod shape extending in the vertical direction. The unlock member 60C is in contact with the top of the moving member 50C. The unlock member 60C is thus always biased toward an unlock position (upward) by the biasing member 75C.

One-Way Clutch Mechanism

Figure 15B:
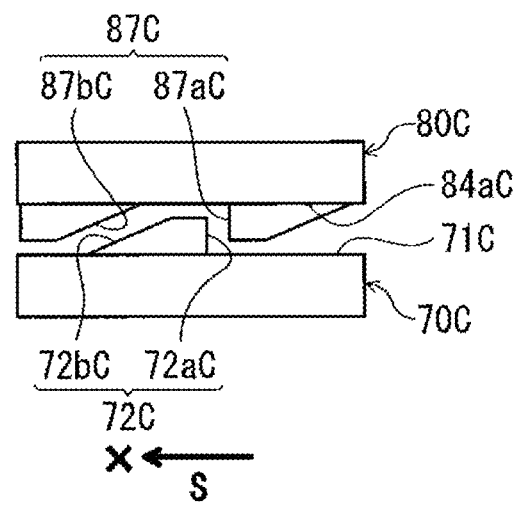
FIG. 15B is a schematic view of a one-way lock mechanism.
Figure 15C:
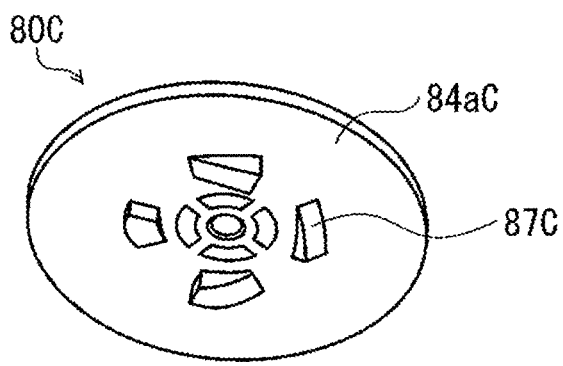
FIG. 15C is a perspective view of the reel as viewed from the back.
Figure 16:
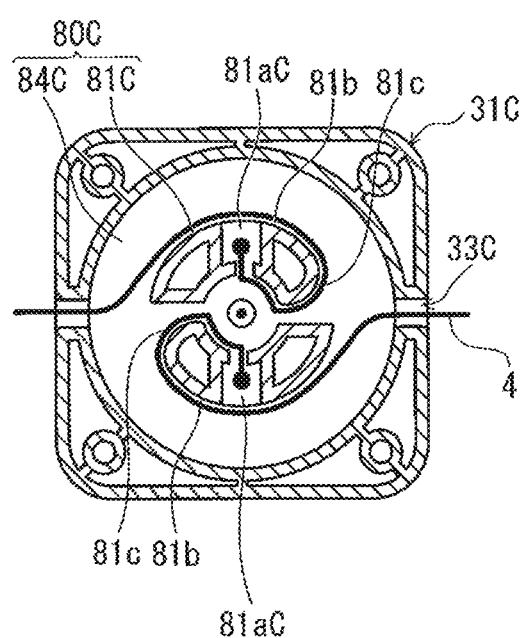
FIG. 16 is a sectional view as viewed from line XVI-XVI in FIG. 12C.

The one-way clutch mechanism will be described with reference to FIGS. 15A to 15C. In the above embodiment, the one-way clutch mechanism is implemented by the lock member 70C moving in a direction perpendicular to the rotation axis. In the present embodiment, however, the one-way clutch mechanism is implemented by the lock member 70C moving in a direction parallel to the rotation axis.

In the present embodiment, the one-way clutch mechanism is implemented by engagement between the engagement teeth 87C on the reel 80C and the engagement pawls 72C on the lock member 70C. The engagement pawls 72C are movable between a first position and a second position. At the first position, the engagement pawls 72C engage with the engagement teeth 87C that rotate with the reel 80C, and prohibit rotation of the reel 80C. At the second position, the engagement pawls 72C disengage from the portion that rotates with the reel 80C, and allows rotation of the reel 80C. Each engagement tooth 87C of the reel 80C includes a first tilted portion 87aC and a second tilted portion 87bC. The angle between the first tilted portion 87aC and the second tilted portion 87bC is preferably, for example, a right angle. The angle of the engagement pawls 72C of the lock member 70C is preferably a right angle so as to conform to the shape of the engagement teeth 87. The engagement pawls 72C move in a direction perpendicular to the engagement teeth 87C.

Motion Transmission Portion and Motion Separation Portion

A motion transmission portion and a motion separation portion that are provided on the rotation operation member 40C and the moving member 50C will be described with reference to FIGS. 17A to 18B. The motion transmission portion and the motion separation portion will be briefly described with reference to the figures since they are substantially the same as those in the first embodiment.

As shown in FIGS. 17C and 17D, the drive gear portion 43 is provided on a back surface 41aC of the rotation operation member 40C (the opposite surface of the rotation operation member 40C from an upper surface 41C). As shown in FIG. 17A, the driven gear portion 53 standing upward is provided along the outer peripheral edge 52 of the moving member 50C.

Figure 17B:
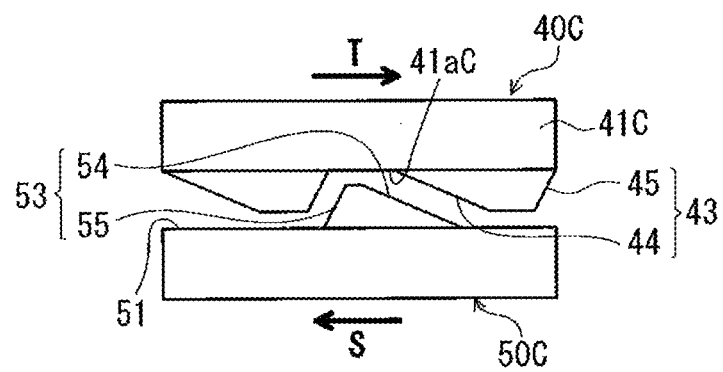
FIG. 17B is a schematic view of a drive gear of the rotation operation member and a driven gear of the moving member.
Figure 17C:
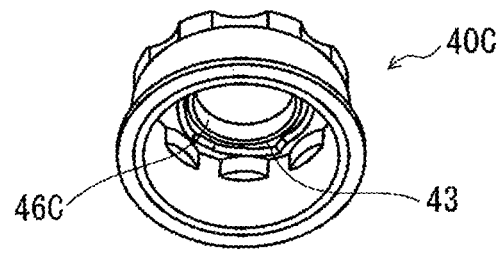
FIG. 17C is a perspective view of the rotation operation member as viewed from the back.
Figure 17D:
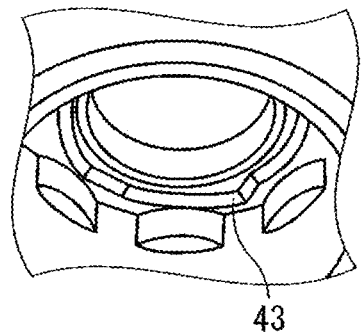
FIG. 17D is an enlarged view of the drive gear portion in FIG. 17C.
Figure 18A:
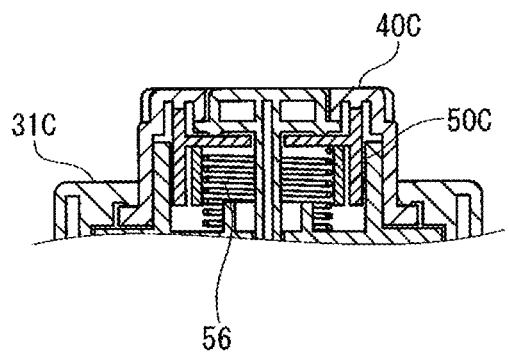
FIGS. 18A to 18B shows sectional views of the rotation operation member, the moving member, and a link member, where

As shown in FIG. 17B, when the rotation operation member 40C is rotated in the winding direction T with the drive gear portion 43 and the driven gear portion 53 meshing with each other, the moving member 50C (reel 80C) also rotate with the rotation operation member 40C. The moving member 50C (reel 80C) rotating with the rotation operation member 40C is shown in FIG. 18A.

Figure 18B:
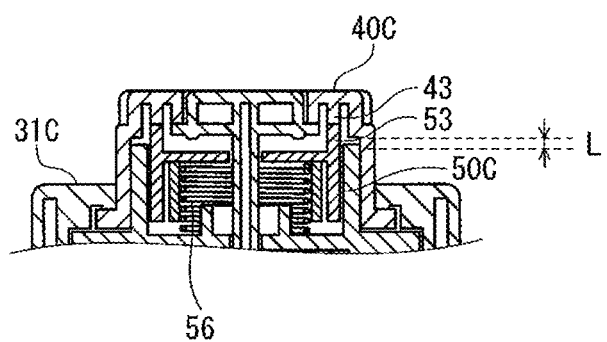

When the rotation operation member 40C continues to be rotated in the winding direction T and the string 4 finishes being wound, the moving member 50C (reel 80C) cannot rotate any more. If the rotation operation member 40C is further rotated in the winding direction T, a certain load or more is applied to the meshing portion between the drive gear portion 43 and the driven gear portion 53. As a result, as shown in FIG. 18B, the drive gear portion 43 gets over the driven gear portion 53, and only the rotation operation member 40C rotates. That is, when a certain load or more is applied to the rotation operation member 40C, the rotational motion of the rotation operation member 40C will not be transmitted to the reel 80C. This state is shown in FIG. 18B. As shown in FIG. 18B, the drive gear portion 43 gets over the driven gear portion 53, and the moving member 50 moves downward by a dimension L. When a certain load or more is applied to the rotation operation member 40C, the moving member 50C repeatedly moves up and down while the rotation operation member 40C rotates without engagement.

For improved operability, the rotation operation member 40C has a one-way clutch structure that does not allow the string 4 to be pulled out. When the rotation operation member 40C is rotated in the feeding direction S, the drive gear portion 43 gets over the driven gear portion 53 and the rotation operation member 40C rotates without engagement. That is, when a certain load or more is applied to the rotation operation member 40C, the rotational motion of the rotation operation member 40C will not be transmitted to the reel 80C.

Operation

The operation of the adjustment mechanism 3C of the second embodiment will be described. The rotation operation member 40C is rotated when winding up the string 4, and the unlock member 60C is pressed and the string 4 is pulled when feeding out the string 4.

Specifically, when winding up the string 4, the rotation operation member 40C is rotated in the winding direction T. As shown in FIGS. 14A and 15B, the engagement teeth 87C of the reel 80C are engaged with the engagement pawls 72C of the lock member 70C, but due to the one-way clutch mechanism, the engagement teeth 87C of the reel 80C repeats the motion of getting over one engagement pawl 72C and engaging with the next engagement pawl 72C of the lock member 70C, so that the reel 80C rotates clockwise and winds up the string 4.

When feeding out the string 4, the operation portion 61C of the unlock member 60C is pressed down as shown in FIG. 14B. The unlock body 62C thus moves the moving member 50C downward, so that the engagement pawls 72C of the lock member 70C are disengaged with the engagement teeth 87C of the reel 80C. The reel 80C thus becomes rotatable, and the string 4 can be fed out by pulling the string 4.

In the present embodiment, the rotation operation member 40C and the unlock member 60C are located at the same position. However, since the unlock member 60C makes a rotational motion, and the operation portion 61C makes a vertical moving motion, the direction in which the unlock member 60C is operated is different from the direction in which the operation portion 60C is operated. This configuration improves operability and prevents or reduces erroneous operations.

First Modification

Figure 19:
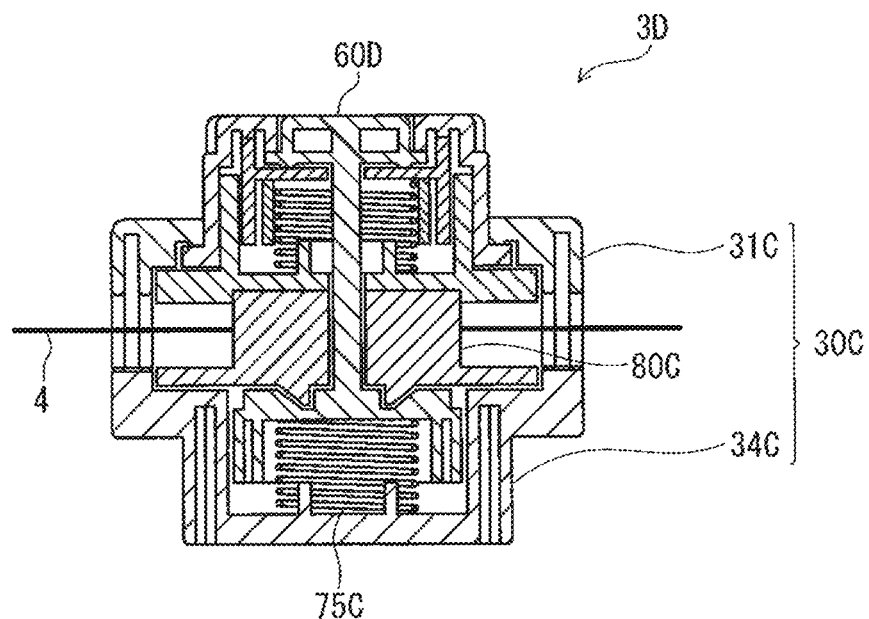
FIG. 19 is a sectional view of a modification of the adjustment mechanism.

An adjustment mechanism 3D in a first modification will be described with reference to FIG. 19. The adjustment mechanism 3D may be a member in which the unlock member 60C and the lock member 70C of the above embodiment are formed integrally. That is, an unlock member 60D has a function to lock or unlock rotation of the reel 80C. By operating the unlock member 60D, the unlock member 60D moves downward, and the reel 80C becomes rotatable. In the adjustment mechanism 3D in the first modification, the unlock member 60C and the lock member 70C of the above embodiment are molded integrally. Therefore, the number of parts is reduced, and the configuration is simplified.

Second Modification

Figure 20:
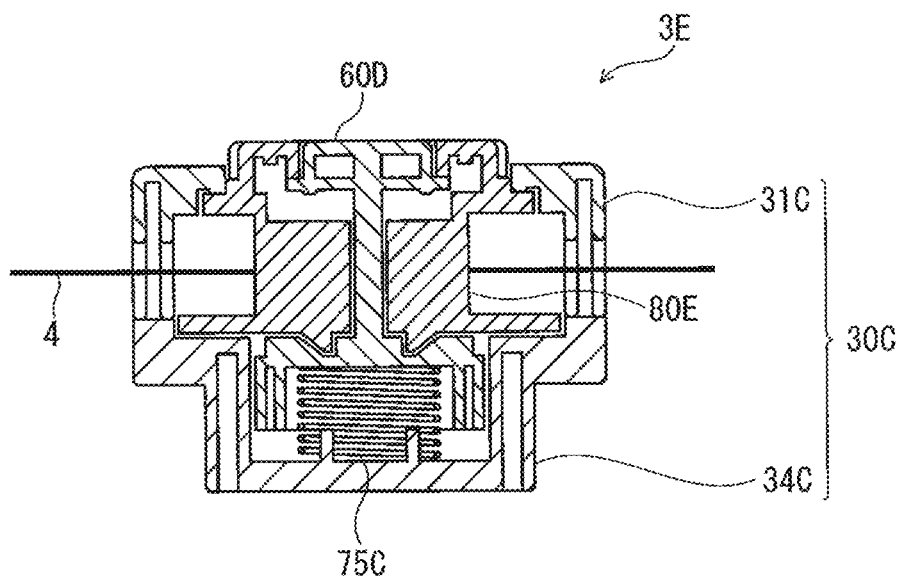
FIG. 20 is a sectional view of another modification of the adjustment mechanism.

An adjustment mechanism 3E in a second modification will be described with reference to FIG. 20. The adjustment mechanism 3E may be a member in which the rotation operating member 40C and the reel 80C of the above embodiment are formed integrally. That is, a reel 80E may be rotated to wind up the string 4. In the adjustment mechanism 3E in the second modification, the rotation operation member 40C and the lock member 70C are molded integrally. Therefore, the number of parts is reduced, and the configuration is simplified. In this modification, a motion transmission portion and a motion separation portion are not provided because the rotation operation member 40C and the moving member 50C of the second embodiment are formed integrally.

Third Embodiment

An adjustment mechanism 3F in a third embodiment will be described with reference to FIGS. 21A to 31B. Only the differences from the adjustment mechanisms 3, 3C of the first and second embodiments will be described in detail. Although there are various differences between the first embodiment and the third embodiment, the third embodiment is generally different from the first embodiment in an unlock member 60F and a lock member 70F. The adjustment mechanism 3F can be attached at various positions on the nursery equipment. In the following description, the vertical direction in FIGS. 21C and 22 is the vertical direction of the adjustment mechanism 3F, and the lateral direction in FIGS. 21C and 22 is the lateral direction of the adjustment mechanism 3F.

The adjustment mechanism 3F generally includes the string 4 and an adjustment mechanism body 5F. Referring particularly to FIGS. 21A-21C and 22, the adjustment mechanism body 5F includes a holder 30F, a rotation operation member 40F, a moving member 50F, an unlock member 60F, a lock member 70F, and a reel 80F. As in the above embodiments, the adjustment mechanism 3F is also configured to wind up the string 4 by the rotation operation member 40F and pull out (feed out) the string 4 by operating the unlock member 60F.

The holder 30F includes an upper holder 31F and a lower holder 34F. As shown in FIGS. 22 and 23, the upper holder 31F has in its upper surface a through hole 32F and a pair of long holes 32W. The through hole 32F is offset to the left, and the long holes 32$f\!f$ face each other in an oblique vertical direction in FIGS. 22 and 23 with the through hole 32F interposed therebetween.

A pair of leg portions 57$c$F of a link member 57F extends through the through hole 32F of the upper holder 31F from above, and engagement pawls 73F, 93F of the lock member 70F extend through the through hole 32F of the upper holder 31F from below. Referring to FIG. 23, the upper holder 31F has ribs 32$a$F along the outer peripheral edge of the through hole 32F. The ribs 32$a$F protrude inward in the through hole 32F. The ribs 32$a$F include arc portions 32$b$F and engagement teeth 32$c$F located at regular intervals along the arc portions 32$b$F. The engagement teeth 32$c$F are provided on the inner peripheral surface of the through hole 32F of the upper holder 31F along the circumferential direction of the reel 80F. Each engagement tooth 32$c$F includes a first tilted portion 32$d$F and a second tilted portion 32$e$F. The first tilted portion 32$d$F forms substantially a right angle with respect to the arc portion 32$b$F, and the second tilted portion 32$e$F forms an obtuse angle with respect to the arc portion 32$b$F. The engagement pawls 73F, 93F of the lock member 70F and the engagement teeth 32$c$F of the upper holder 31F are a "rotation lock mechanism" that prohibit rotation of the reel 80F.

Figure 21A:
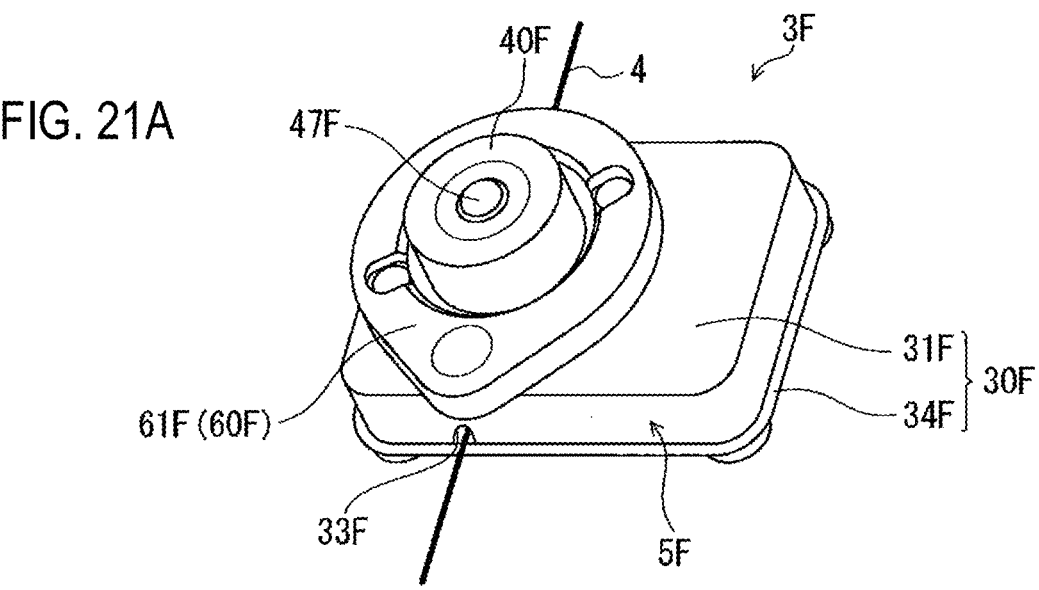
FIGS. 21A to 21C shows an adjustment mechanism in a third embodiment of the present invention, where
Figure 21B:
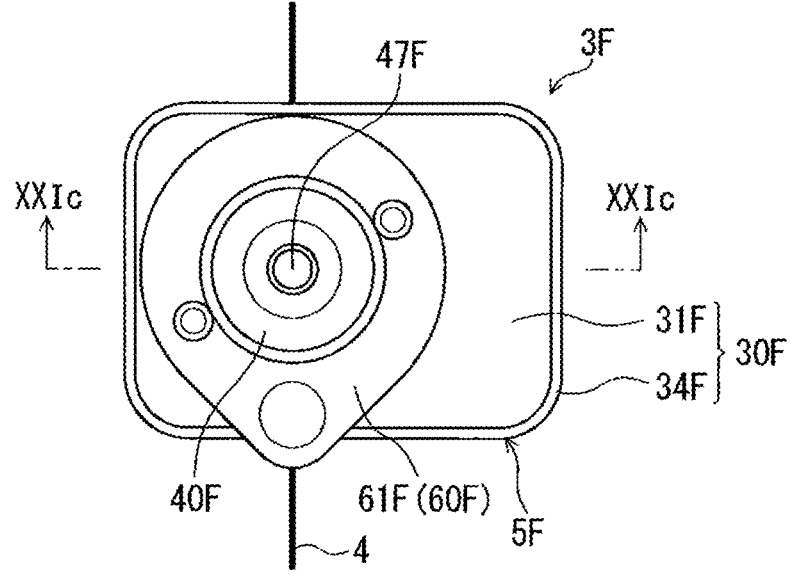
Figure 21C:
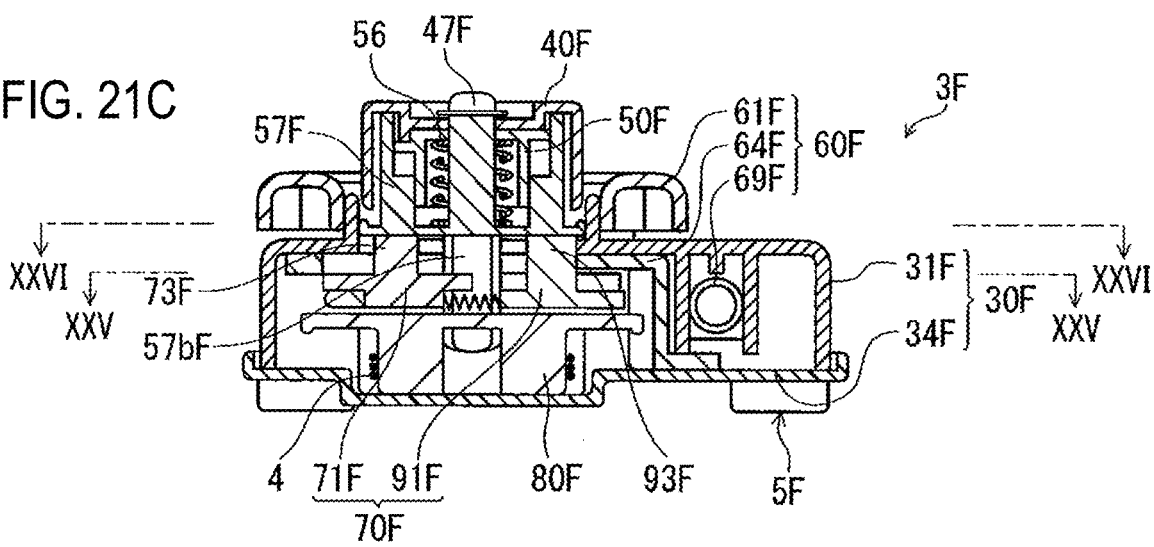
Figure 22:
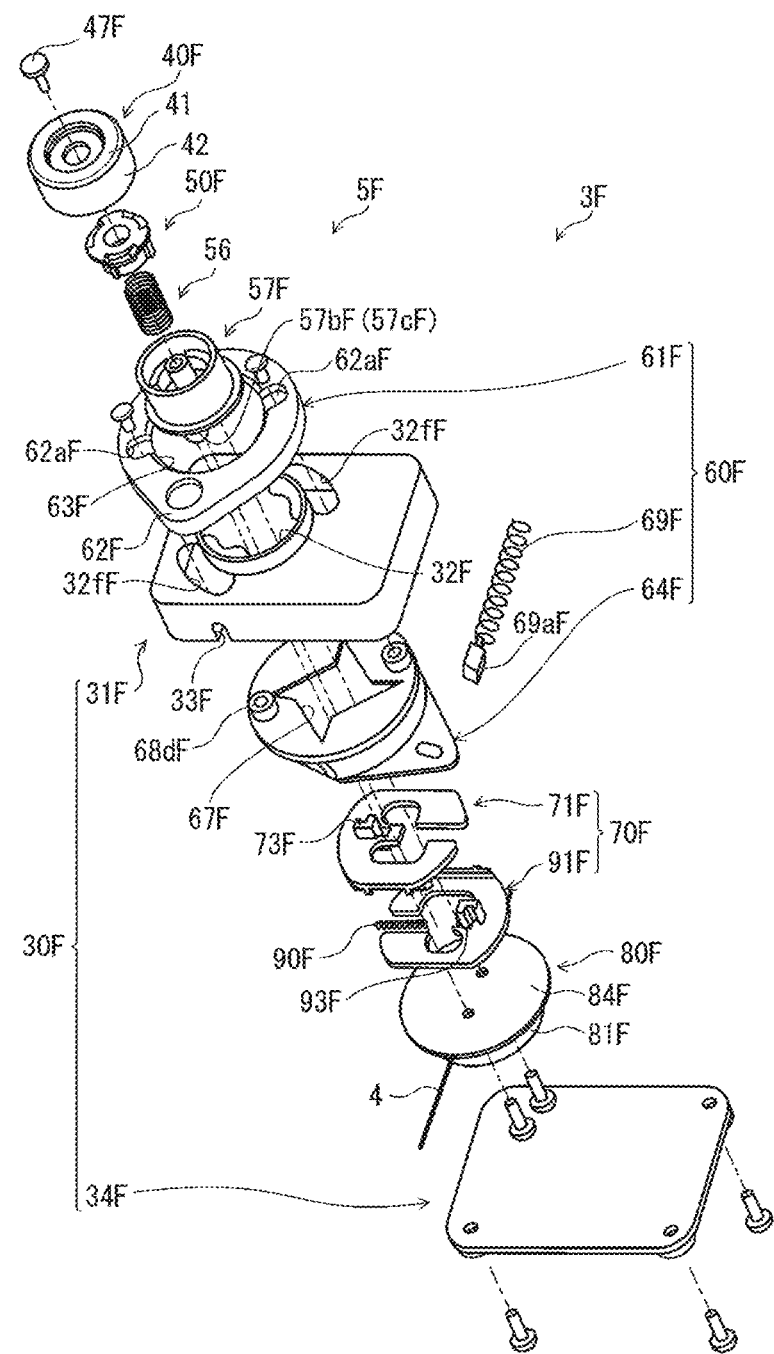
FIG. 22 is an exploded perspective view of the adjustment mechanism in the third embodiment of the present invention.
Figure 23:
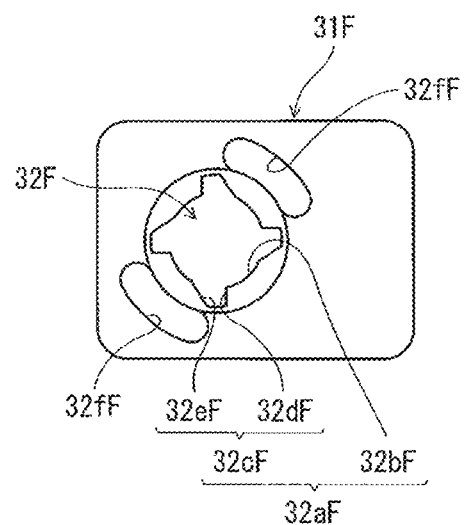
FIG. 23 is a plan view of an upper holder.

As shown in FIGS. 21A and 22, the upper holder 31F has string holes 33F in a pair of side surfaces thereof. The string 4 extends through the string holes 33F. The long holes 32$f$F have an arc shape conforming to the circular shape of the through hole 32F. Screw holes 68$d$F of a second release member 64F that will be described later extend through the long holes 32W.

As shown in FIG. 22, the lower holder 34F serves as a lower lid, and is, for example, a rectangular plate member. Legs may be provided at the four corners of the lower holder 34F.

Figure 28A:
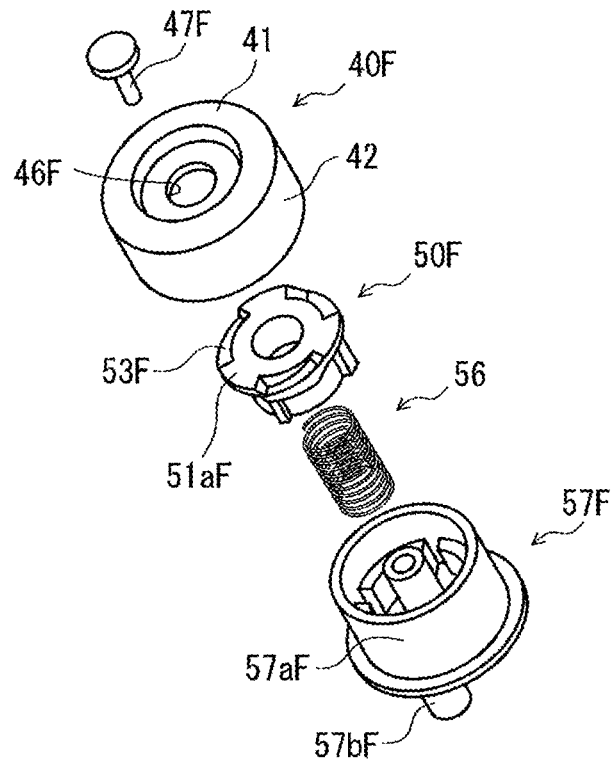
FIG. 28A is a perspective view of the rotation operation member, the moving member, a biasing portion, and the link member.
Figure 28B:
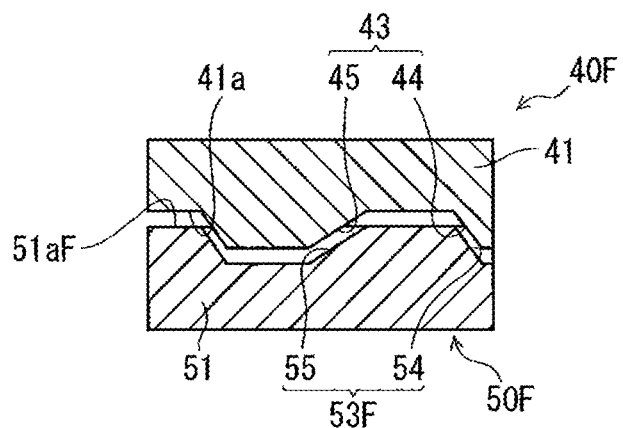
FIG. 28B is a schematic view of a drive gear of the rotation operation member and a driven gear of the moving member.
Figure 28C:
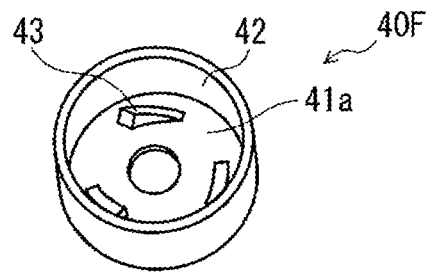
FIG. 28C is a perspective view of the rotation operation member as viewed from the back.
Figure 29A:
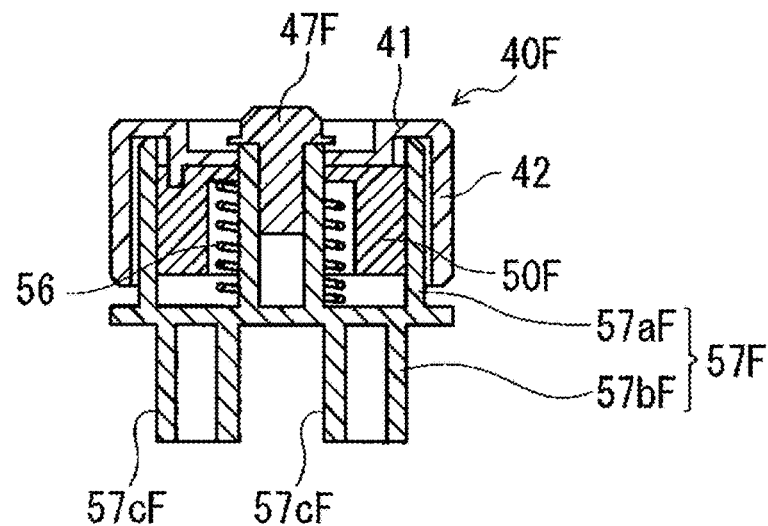
FIGS. 29A to 29B shows sectional views of the rotation operation member, the moving member, the biasing portion, and the link member, where

The rotation operation member 40F is a member for controlling rotation of the reel 80F. As shown in FIGS. 28A and 29A, the rotation operation member 40F has a through hole 46F substantially in the center of its upper surface 41. A screw 47F extends through the through hole 46F and supports the moving member 50F such that the moving member 50F can move in the vertical direction. As shown in FIG. 28C, the drive gear portion 43 protruding downward is provided on the back surface 41a of the rotation operation member 40F (the opposite surface of the rotation operation member 40F from the upper surface 41).

As shown particularly in FIGS. 28A and 28B, the moving member 50F is located below the rotation operation member 40F. A driven gear portion 53F is provided on the moving member 50F. The driven gear portion 53F is recessed downward from an upper surface 51aF of the moving member 50F. The driven gear portion 53F engages with the driven gear portion 43 on the rotation operation member 40F.

As shown in FIG. 29A, the link member 57F includes an upper portion 57aF and a lower portion 57bF. The upper portion 57aF has a cylindrical shape that is open upward. The upper portion 57aF holds the moving member 50F and the biasing member 56 therein. The lower portion 57bF includes the pair of leg portions 57cF protruding downward. The leg portions 57cF are connected to the reel 80F. The link member 57F is thus fixed to the reel 80F, so that rotation of the link member 57F is directly coupled to rotation of the reel 80.

Figure 27A:
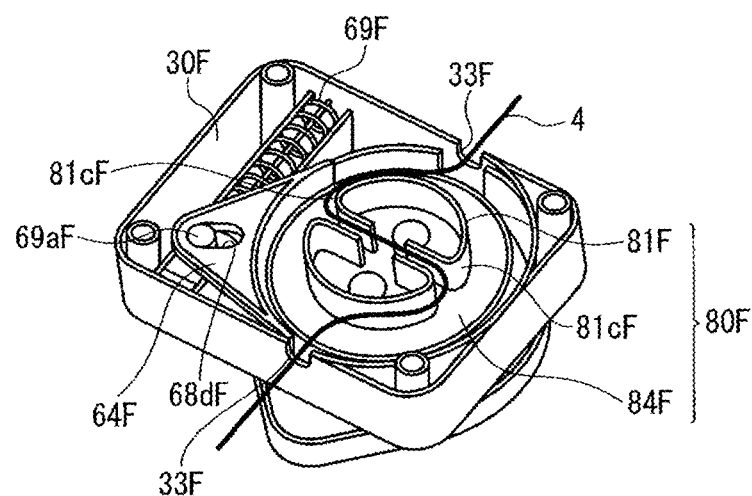
FIGS. 27A to 27B shows a lower holder of the adjustment mechanism, where
Figure 27B:
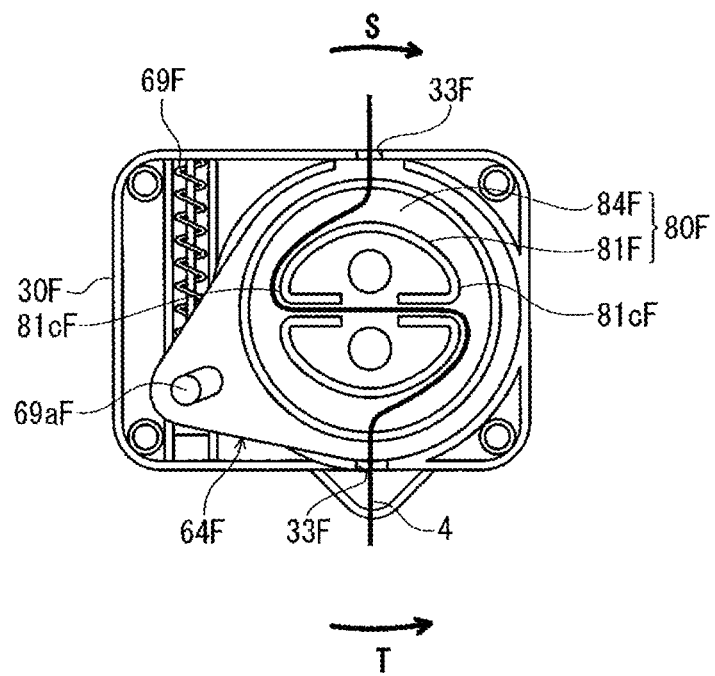

As shown in FIGS. 22 and 27A-27B, the reel 80F includes a string holding portion 81F and a flange 84F that rotatably holds the string holding portion 81F. In FIG. 27B, the winding direction T and the feeding direction S of the string 4 are shown by arrows. The string 4 is placed in the string holding portion 81F in substantially the same manner as in the string holding portion 81 of the first embodiment. In the present embodiment, there is no fixing portion that fixes the string 4 to the reel 80F. However, as in the first embodiment, the string 4 may be fixed at its middle in the longitudinal direction as viewed in plan. In the first embodiment, the rounded portions 81c are provided only where the string 4 is wound back, and the string holding portion 81 does not have a symmetrical shape. In the present embodiment, however, the string holding portion 81F may be a symmetrical shape, and rounded portions 81cF may be provided even where the string 4 is not wound back.

As shown in FIG. 22, the flange 84F of the reel 80F extends in a direction perpendicular to the rotation axis of the reel 80F. The flange 84F is located above the string holding portion 81F, and is connected to the leg portions 57cF of the link member 57F. That is, the reel 80F is connected to the link member 57F. When the link member 57F rotates, the reel 80F rotates with the link member 57F.

Figure 24A:
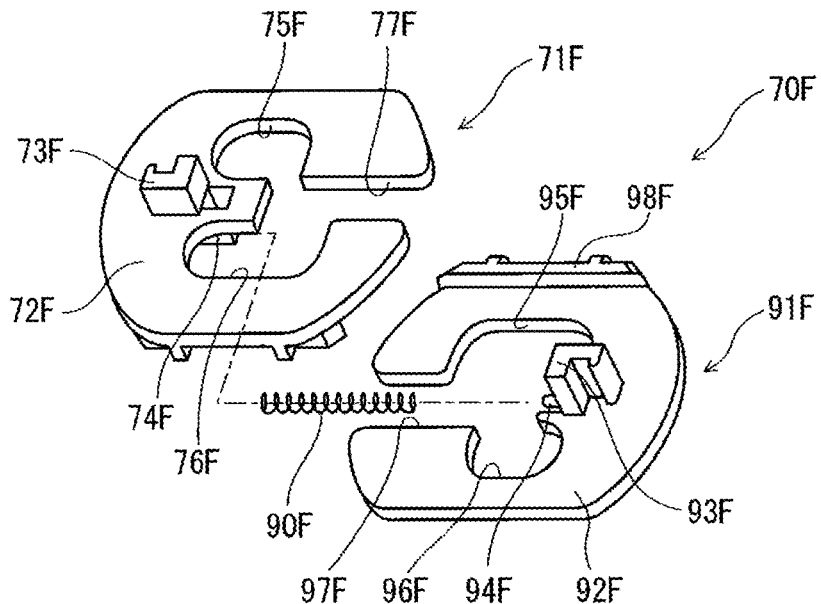
FIG. 24A is a perspective view of a rotation operation member, a moving member, and a link member.

The lock member 70F will be described with reference to FIGS. 22 to 26D. Referring particularly to FIG. 24A, the lock member 70F of the present embodiment includes an upper slide member 71F, a lower slide member 91F located under the upper slide member 71F, and a spring 90F located between the upper slide member 71F and the lower slide member 91F.

The upper slide member 71F includes a slide body 72F, an engagement pawl 73F, a support portion 74F, a first cut 77F, a first hole 75F, and a second hole 76F. The engagement pawl 73F protrudes upward from the slide body 72F. The support portion 74F protrudes downward from the slide body 72F. The first cut 77F is formed in the slide body 72F. The first hole 75F and the second hole 76F branch from the first cut 77F.

The lower slide member 91F is provided substantially symmetrically with the upper slide member 71F. The lower slide member 91F includes a slide body 92F, an engagement pawl 93F, a support portion 94F, a first cut 97F, a first hole 95F, and a second hole 96F. The engagement pawl 93F protrudes upward from the slide body 92F. The support portion 94F protrudes downward from the slide body 92F. The first cut 97F is formed in the slide body 92F. The first hole 95F and the second hole 96F branch from the first cut 97F. The engagement pawls 73F, 93F extend through the through hole 32F of the upper holder 31. The engagement pawls 73F, 93F move in the horizontal direction with respect to the engagement teeth 32cF. A guide portion 98F extending in the lateral direction is provided on the upper portion in the figures of the lower slide member 91F in order to guide the lateral sliding motion of the upper slide member 71F.

Figure 24B:
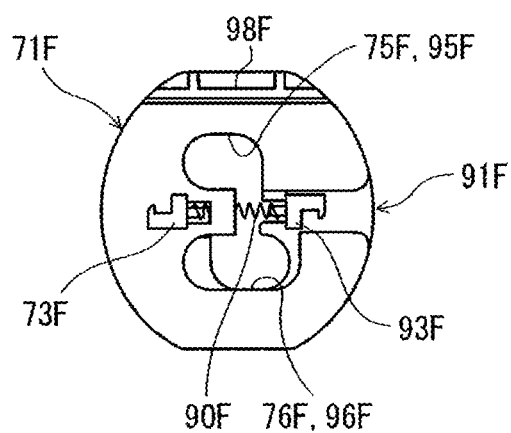
FIG. 24B is a schematic view of a drive gear of the rotation operation member and a driven gear of the moving member.
Figure 24C:
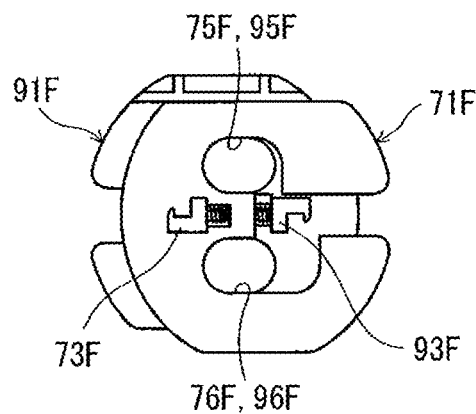
FIG. 24C is a perspective view of the rotation operation member as viewed from the back.

Since the upper slide member 71F and the lower slide member 91F are placed on top of each other in the vertical direction, the first holes 75F, 95F vertically communicate with each other, and the second holes 76F, 96F vertically communicate with each other. As shown in FIGS. 24B and 24C, as the upper slide member 71F slides to the right and the lower slide member 91F slides to the left, the first holes 75F, 95F and the second holes 76F, 96F change in shape and become smaller.

The spring 90F is placed between the support portion 74F of the upper slide member 71F and the support portion 94F of the lower slide member 91F. The upper slide member 71F and the lower slide member 91F are thus always biased in the directions away from each other.

Figure 25A:
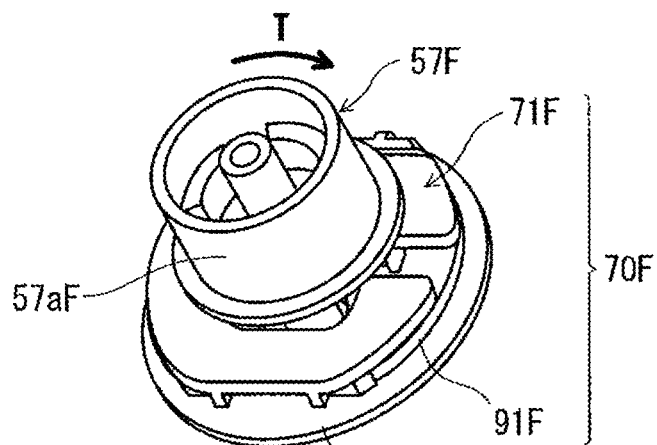
FIG. 25A is a perspective view of the link member and a lock member and FIGS. 25B to 25D are partial sectional views as viewed line XXV-XXV in FIG. 21C, showing the state in which the link member is rotated.

Next, the operation of the lock member 70F will be described. As shown in FIGS. 22 and 25A-25D, the leg portions 57cF of the link member 57F extend through the first holes 75F, 95F and the second holes 76F, 96F of the lock member 70F. The leg portions 57cF of the link member 57F are connected to the reel 80F with screws. The lock member 70F is sandwiched between the link member 57F and the reel 80F. Therefore, when the link member 57F is rotated in the winding direction T in FIG. 25A, one leg portion 57cF of the link member 57F pushes the first hole 75F of the upper slide member 71F to the right, and the other leg portion 57cF of the link member 57F pushes the second hole 96F of the lower slide member 91F to the left, as shown in FIG. 25C. As a result, the upper slide member 71F moves to the right, the lower slide member 91F moves to the left, and the engagement pawls 73F, 93F of the lock member 70F move inward.

Figure 25B:
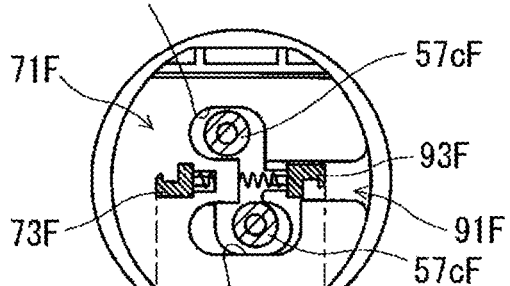
Figure 25C:
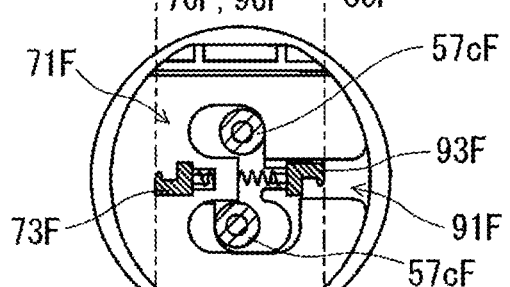
Figure 25D:
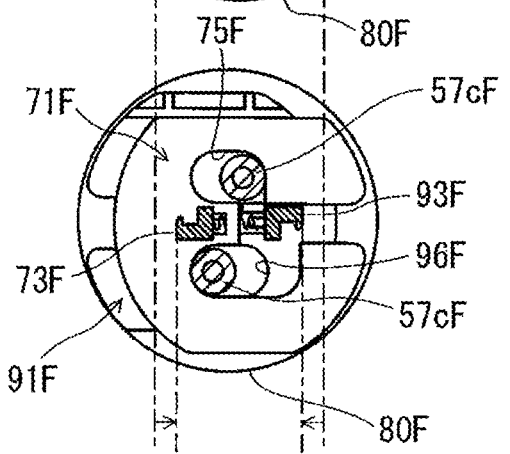
Figure 26A:
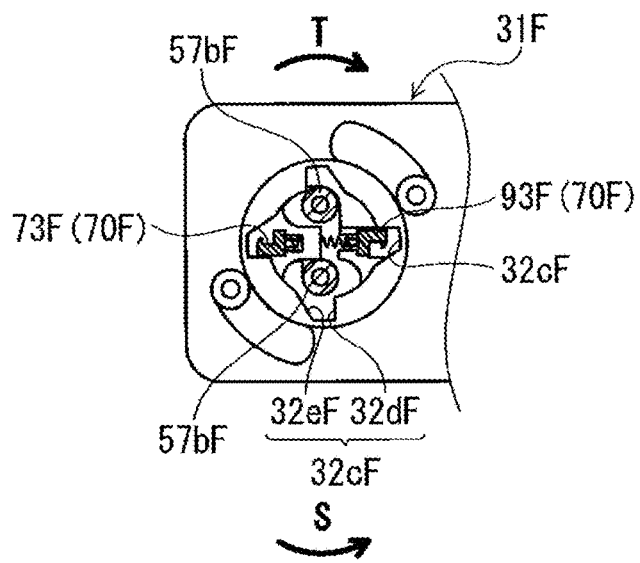
FIGS. 26A to 26D are partial sectional views as viewed from line XXVI-XXVI in FIG. 21C, showing the state in which the link member is rotated.
Figure 26B:
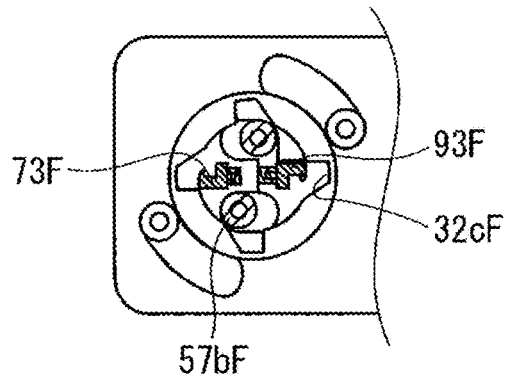
Figure 26C:
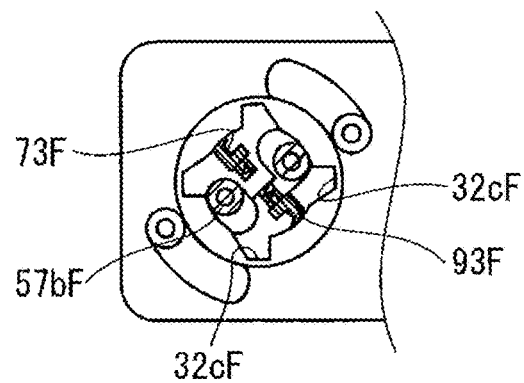
Figure 26D:
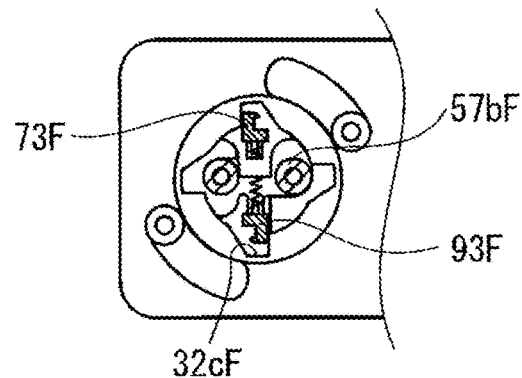
Figure 29B:
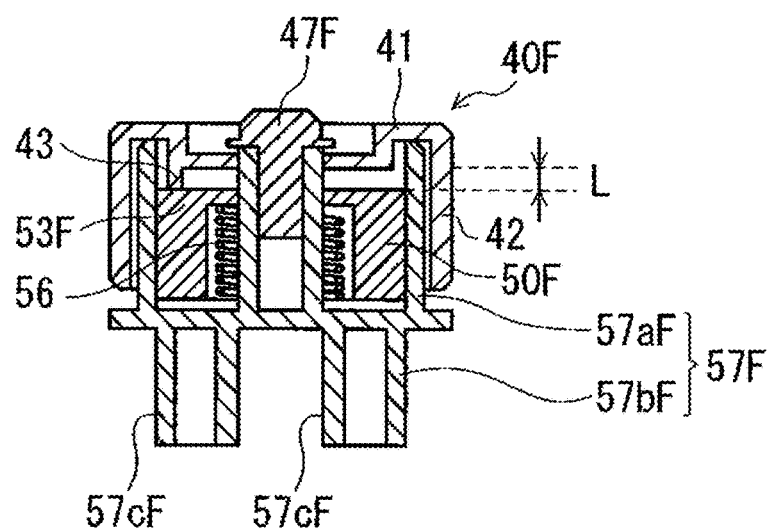

FIGS. 26A to 26D are sectional views as viewed from line XXVI-XXVI in FIG. 21C, showing the upper holder 31F placed on the structure shown in FIGS. 25B to 25D. When the link member 57F is rotated, the engagement pawls 73F, 93F of the lock member 70F rotate with the link member 57 with the distance between the engagement pawls 73F, 93F increased and decreased. Specifically, when the link member 57 is rotated in the winding direction T in the state shown in FIG. 26A, the engagement pawls 73F, 93F of the lock member 70F approach each other as shown in FIG. 29B. When the link member 57F is further rotated, the engagement pawls 73F, 93F of the lock member 70F engage with the next engagement tooth 32cF. The engagement pawls 73F, 93F of the lock member 70F thus wind up the string 4 while rotating, for example, by increments of 45 degrees. The lock member 70 does not rotate in the feeding direction S of the string 4 due to the one-way clutch mechanism.

The unlock member 60F will be described with reference to FIGS. 22, 30, and 31A-3B. FIG. 31A shows the state in which the unlock member 60 is not operated, and FIG. 31B shows the state in which the unlock member 60 is operated. The figures on the left side of in FIGS. 31A and 31B are plan views showing only the upper holder 31F and the second release member 64F, and the figures on the right side of FIGS. 31A and 31B shows the upper holder 31F, the second release member 64F, and a first release member 61F placed on the upper holder 31F with the portion of FIG. 26A seen through. The unlock member 60 unlocks the reel 80F from the rotation prohibited state when the unlock member 60 moves in a direction perpendicular to the rotation axis of the reel 80F. For better understanding, the first release member 64F is shown shaded in FIGS. 30 and 31A-31B.

Referring particularly to FIG. 22, the unlock member 60F includes the first release member 61F, the second release member 64F, and a biasing portion 69F. The first release member 61F is operated by the user. The second release member 64F slides in the vertical direction when the first release member 61F is operated. The biasing portion 69F biases the second release member 64F in the opposite direction to the unlock direction. The first release member 61F and the second release member 64F are configured to move together. The biasing portion 69F is, for example, a coil spring, and biases the first release member 61F and the second release member 64F in the directions away from each other. The first release member 61F, the second release member 64F, and the biasing portion 69F may not be separate members, but may be a single-piece member.

The first release member 61F includes an unlock body 62F and a through hole 63F located substantially in the center of the unlock body 62F. The unlock body 62F further has a pair of screw holes 62aF. Although the unlock body 62F has a substantially circular shape as viewed in plan, a part of the unlock body 62F protrudes and serves as an operation portion. The leg portions 57cF of the link member 57F extend through the through hole 63F.

Figure 30:
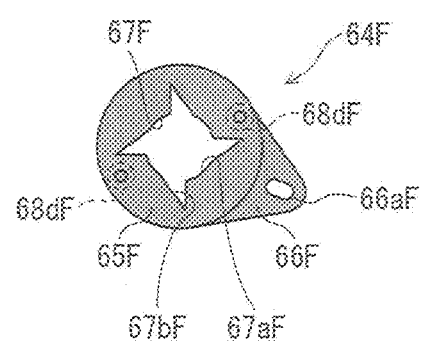
FIG. 30 is a plan view of the lock member.
Figure 31A:
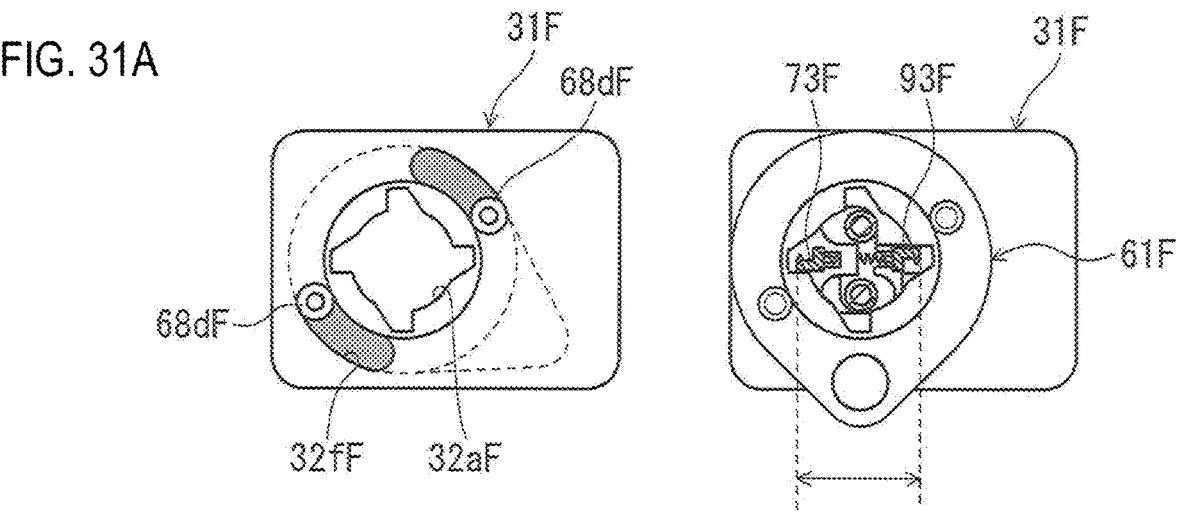
FIG. 31A shows the state in which the unlock member is not operated.
Figure 31B:
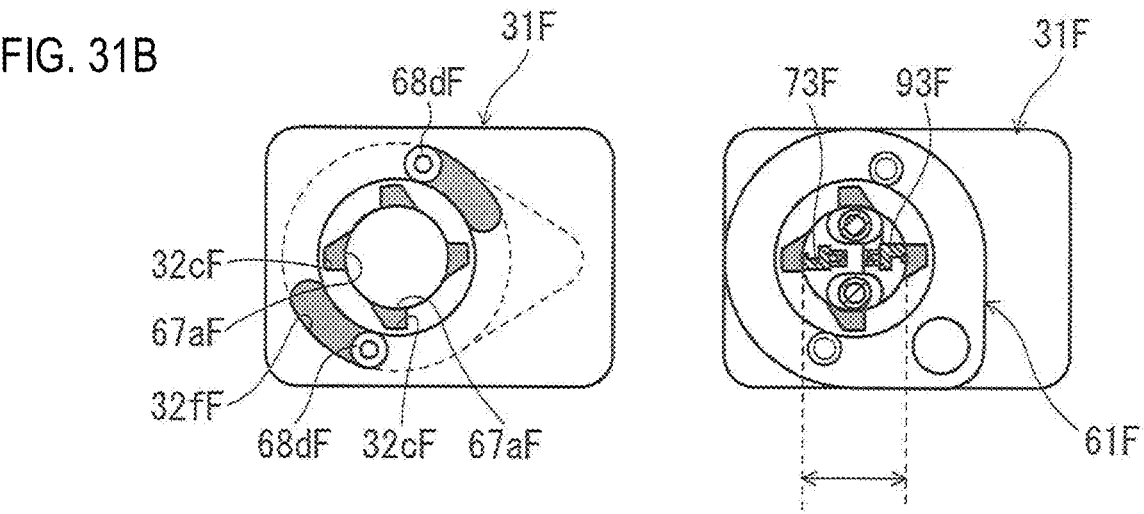
FIG. 31B shows the state in which the unlock member is operated.

Referring to FIGS. 22 and 30, the second release member 64F includes a release body 65F and a protrusion 66F protruding from the release body 65F. The release body 65F has a through hole 67F substantially in its center, and has a pair of screw holes 68dF around the through hole 67F. The leg portions 57cF of the link member 57F extend through the through hole 67F. Screws extending through the screw holes 62aF of the first release member 61F extend through the screw holes 68dF. The protrusion 66F has a hole 66aF. A pin member 69aF located at an end of the biasing member 69F extends through the hole 66aF. The unlock member 62F is thus biased in the opposite direction to the unlock direction.

Next, the operation of the unlock member 60F will be described. As shown in FIG. 31A, when the first release member 61F of the unlock member 60F is rotated counterclockwise (by about 45 degrees), the second release member 64F is also rotated counterclockwise. As shown in FIG. 31B, the engagement teeth 32cF of the ribs 32aF of the upper holder 31F are covered by arc portions 67aF of the second release member 64F, and the engagement pawls 73F, 93F of the lock member 70F move inward, so that the reel 80F connected to the lock member 70F becomes rotatable. The lock member 70F can thus be disengaged from the upper holder 30F by moving the unlock member 60F in a direction perpendicular to the rotation axis of the reel 80F.

One-Way Clutch Mechanism

The one-way clutch mechanism will be described with reference to FIGS. 26A to 26D. As in the first embodiment, the one-way clutch mechanism of the present embodiment is implemented by the lock member 70F moving in a direction perpendicular to the rotation axis.

The one-way clutch mechanism of the present embodiment is implemented by engagement between the engagement teeth 32cF on the upper holder 31F and the engagement pawls 73F, 93F on the lock member 70F. The engagement pawls 73F, 93F move in a direction perpendicular to the engagement teeth 32cF. Each engagement tooth 32cF of the upper holder 31F includes the first tilted portion 32dF and the second tilted portion 32eF. The angle between the first tilted portion 32dF and the arc portion 32bF is preferably, for example, a right angle. The angle between the second tilted portion 32eF and the arc portion 32bF is preferably, for example, an obtuse angle. This structure allows the reel 80F to rotate in the winding direction T, but does not allow the reel 80F to rotate in the feeding direction S.

Motion Transmission Portion and Motion Separation Portion

A motion transmission portion and a motion separation portion that are provided between the rotation operation member 40F and the moving member 50F will be described with reference to FIGS. 25A to 26D. The motion transmission portion and the motion separation portion will be briefly described with reference to the figures since they are substantially the same as those in the first embodiment.

As shown in FIG. 28C, the drive gear portion 43 is provided on the back surface of the rotation operation member 40F. As shown in FIG. 28A, the driven gear portion 53F is provided on the upper surface of the moving member 50F.

As shown in FIG. 28A, when the rotation operation member 40F is rotated with the drive gear portion 43 meshing with the driven gear portion 53F, the moving member 50F (reel 80F) also rotates with the rotation operation member 40F. When the rotation operation member 40F continues to be rotated in the winding direction T and the string 4 finishes being wound, the moving member 50F (reel 80F) cannot rotate any more, and a certain load or more is applied to the meshing portion between the drive gear portion 43 and the driven gear portion 53F. If the rotation operation member 40F is further rotated in this state, the drive gear portion 43 gets over the driven gear portion 53F, and only the rotation operation member 40F rotates, as shown in FIG. 28B. That is, when a certain load or more is applied to the rotation operation member 40F, the rotational motion of the rotation operation member 40F will not be transmitted to the reel 80F.

For improved operability, the rotation operation member 40F has a one-way clutch structure that does not allow the string 4 to be pulled out. When the rotation operation member 40F is rotated in the feeding direction S, the drive gear portion 43 gets over the driven gear portion 53F and the rotation operation member 40F rotates without engagement. That is, when a certain load or more is applied to the rotation operation member 40F, the rotational motion of the rotation operation member 40F will not be transmitted to the reel 80F.

Operation

The operation of the adjustment mechanism 3F of the third embodiment will be described. The rotation operation member 40F is rotated when winding up the string 4, and the unlock member 60F is rotated and the string 4 is pulled when feeding out the string 4.

Specifically, when winding up the string 4, the rotation operation member 40F (reel 80F) is rotated clockwise as shown in FIG. 25A. Due to the one-way clutch mechanism, each of the engagement pawls 73F, 93F of the lock member 70 repeats the motion of disengaging from one engagement tooth 32cF of the upper holder 31F and engaging with the next engagement tooth 32cF of the upper holder 31F, so that the reel 80F also rotates clockwise and winds up the string 4, as shown in FIGS. 26A to 26D.

When feeding out the string 4, the first release member 61F of the unlock member 60F is rotated counterclockwise (in the direction shown by arrow S in FIG. 26A) as shown in FIGS. 31A and 31B. The second release member 64F thus rotates, and the arc portions 67aF of the second release member 62F cover the engagement teeth 32cF of the upper holder 31F. Therefore, the engagement pawls 73F, 93F of the lock member 70F will not engage with the engagement teeth 32cF of the upper holder 31F. The reel 80F thus becomes rotatable, and the string 4 can be fed out by pulling the string 4.

In the present embodiment, the unlock member 60F and the unlock member 70F are separate members. However, the unlock member 60F and the unlock member 70F may be a single-piece member, as in the above embodiments.

First Modification

An adjustment mechanism 3G in a first modification will be described with reference to FIGS. 32A to 32D. The adjustment mechanism 3G is different from the third embodiment in the configuration of the motion transmission portion and the motion separation portion. In the third embodiment, the biasing member 56 is provided under the moving member 50F, and the moving member 50F is biased toward the rotation operation member 40F. In the present modification, however, a rotation operation member 40G is biased toward a moving member 50G.

Specifically, the adjustment mechanism 3G further includes a lid 48G that is fitted in a recess 46G in the upper surface of a rotation operation member 40G. A biasing member 56G that biases the rotation operation member 40G downward is provided between the recess 46G of the rotation operation member 40G and the lid 48G. Accordingly, when the rotation operation member 40G is rotated under more than a certain load, the drive gear portion 43 on the rotation operation member 40G gets over the driven gear portion 53 on the moving member 50G, and the rotation operation member 40G rotates without engagement. In the present modification, the rotation operation member 40G moves up and down when the rotation operation member 40G rotates without engagement.

Fourth Embodiment

Figure 33:
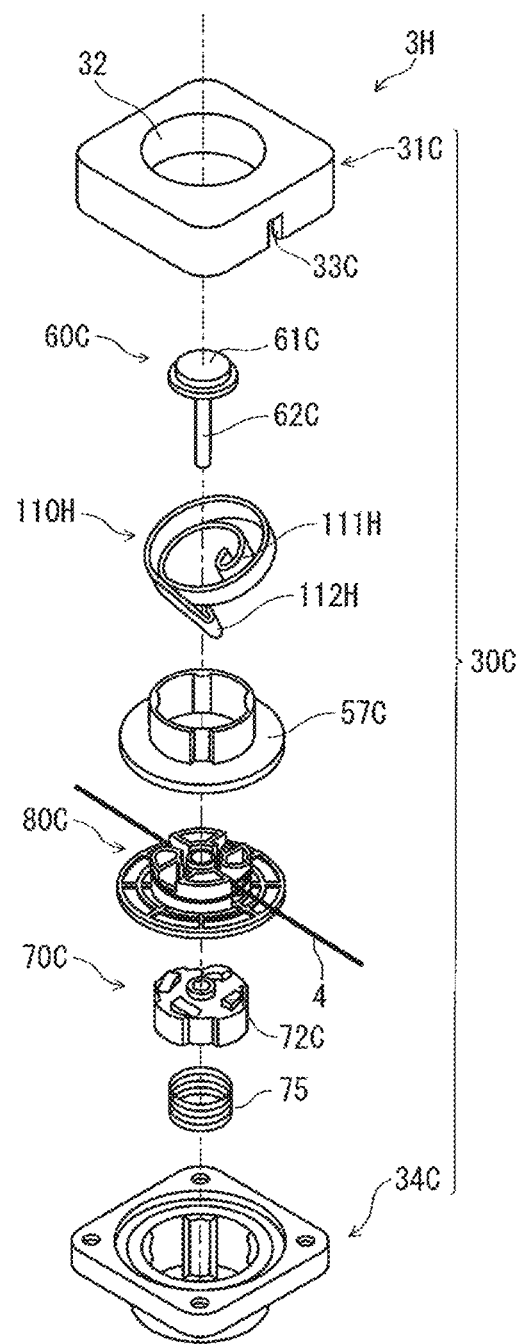
FIG. 33 is an exploded perspective view of an adjustment mechanism according to a fourth embodiment of the present invention.

An adjustment mechanism 3H in a fourth embodiment will be described with reference to FIGS. 33 and 34A-34D. Only the differences from the adjustment mechanism 3C in the second embodiment will be described in detail. The present embodiment is different from the second embodiment in that the rotation operation member is not provided and a biasing member 110H for biasing the reel 80C in the winding direction is provided. The adjustment mechanism 3H can be attached at various positions on the nursery equipment. In the following description, the upward direction in FIG. 33 is the upward direction of the adjustment mechanism 3H, and the downward direction in FIG. 33 is the downward direction of the adjustment mechanism 3H.

The adjustment mechanism 3H of the present embodiment includes the string 4, the holder 30C, the unlock member 60C, the lock member 70C, the reel 80C, and the biasing member 110H. The adjustment mechanism 3H can automatically wind up the loose string 4.

The biasing force of the biasing member 110H is set to be smaller than the biasing force with which a movable portion tends to move downward in the vertical direction. The biasing force will be described in detail in the description of the operation. The biasing member 110H is, for example, a mainspring wound in a helical shape. One end of the biasing member 110H, namely a radially inner end of the biasing member 110H, is fixed to the reel 80C, and the other end of the biasing member 110H, namely a radially outer end of the biasing member 110H, is fixed to the upper holder 31C. The reel 80C is thus always biased in the winding direction of the spring 4.

In the present embodiment, the mainspring is used as the biasing member 110H. However, the biasing member 110H may be any member that biases the reel 80C so that the reel 80C rotates in the winding direction of the string 4. For example, the biasing member 110H may be other spring, or may be other biasing member that applies an elastic biasing force.

As described above, the lock member 70C is a one-way clutch mechanism that allows rotation of the reel 80C in the winding direction of the string 4 and prohibits rotation of the reel 80C in the feeding direction of the string 4. The one-way clutch mechanism may have a configuration in which a motion transmission portion and a motion separation portion are provided like the drive gear portion 43 and the driven gear portion 53, or may be a configuration similar to that described in the second embodiment.

The engagement pawls 72C of the lock member 70C are reel lock pawls that lock rotation of the reel 80C. The reel lock pawls are movable between a first position and a second position. At the first position, the reel lock pawls engage with a portion that rotates with the reel 80C, and prohibit rotation of the reel 80C. At the second position, the reel lock pawls disengage from the portion that rotates with the reel 80C, and allows rotation of the reel 80C. This motion of the engagement pawls 72C is performed by the lock member 70C sliding up and down, and is shown in FIGS. 14A and 14B.

The lock member 70C is caused to slide up and down by the unlock member 60C. The unlock member 60C is a member that moves the lock member 70C to the second position so that the reel 80C can rotate freely.

The operation of a car seat 1C will be described with reference to FIGS. 34A to 34D. The car seat 1C is nursery equipment that uses the adjustment mechanism 3H in the fourth embodiment. The basic configuration of the car seat 1C used in the present embodiment is substantially the same as that of the car seat 1B in FIGS. 3A-3C.

As shown in FIGS. 34A-34D, an adjustment mechanism body 5H is provided at the upper end of the backrest portion 22 of the car seat 1C. The string 4 is attached to the rotating portion 28 of the flip-up mechanism 27 for the shoulder strap 23. The flip-up mechanism 27 for the shoulder strap 23 is a mechanism that fixes the shoulder strap 23 so as to open the seat 20 so that the shoulder belt 23 does not interfere when a child is seated on the car seat 1C.

Figure 34A:
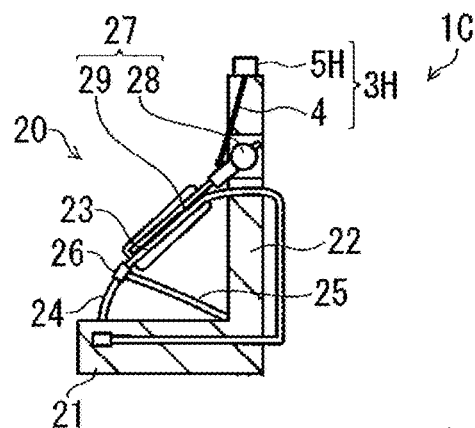
FIGS. 34A to 34D are schematic views illustrating the operation of a car seat according to the fourth embodiment of the present invention.
Figure 34B:
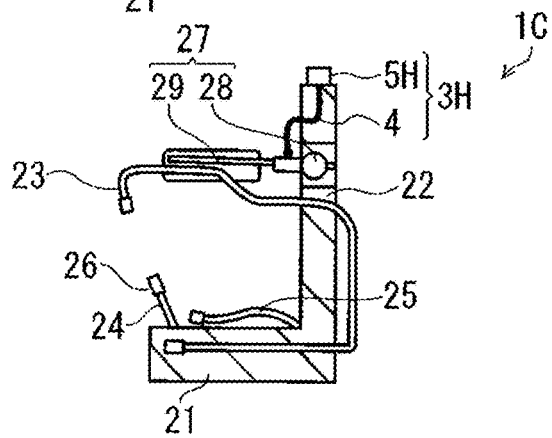

When the buckle 26 is disconnected from the state shown in FIG. 34A and the shoulder strap 23 is moved upward as shown in FIG. 34B, the string 4 connected to the rotating portion 28 becomes loose. The adjustment mechanism 3H includes the biasing member 110H (FIG. 33) that biases the reel 80C so that the reel 80C rotates in the winding direction of the string 4. The biasing force of the biasing member 110H is set to be smaller than the biasing force with which the shoulder strap 23 and the flip-up mechanism 27 move downward in the vertical direction due to their own weight. In other words, the biasing member 110H rotates the reel 80C to wind up the string 4 when the biasing force with which the shoulder strap 23 and the flip-up mechanism 27 move downward in the vertical direction is no longer applied.

Figure 34C:
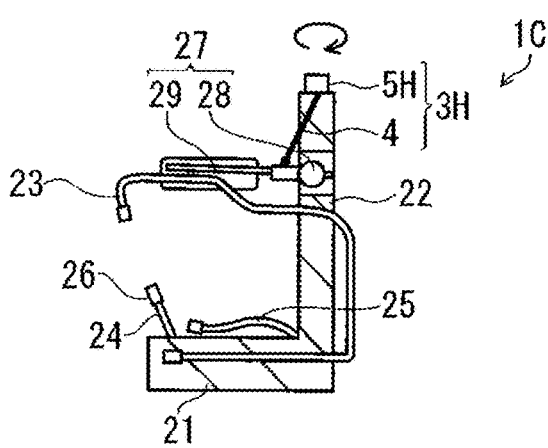

Since the reel 80C is biased to rotate in the winding direction of the string 4, the loose string 4 is wound on the reel 80C as shown in FIG. 34C. Since the loose string 4 can be wound up without requiring the user to do anything, the user can smoothly get a child into and out of the car seat 1C.

Figure 34D:
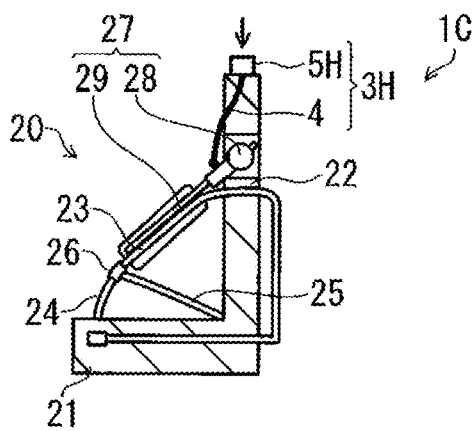

After getting a child into the car seat 1C, the user operates the operation portion 61C of the unlock member 60C to unlock the lock member 70C and the reel 80C, as shown in FIG. 34D. Since the biasing force of the biasing member 110H is smaller than the biasing force with which the shoulder strap 23 and the flip-up mechanism 27 tend to move downward in the vertical direction, the string 4 is automatically pulled out due to the weight of the shoulder strap 23 and the flip-up mechanism 27. Lastly, the user connects the shoulder straps 23 by the buckle 26.

In the present embodiment, the movable portion is the flip-up mechanism 27 for the shoulder strap 23 and the shoulder strap 23. However, the movable portion may be any member that tends to move downward in the vertical direction due to its own weight. For example, in a reclining mechanism of a stroller, the backrest portion may be a movable portion. Alternatively, regarding headrest height adjustment of a baby carrier, the headrest portion may be a movable portion.

Although the movable portion moves downward in the vertical direction in the above description, the movable portion need not necessarily move downward perpendicularly to a horizontal plane, but may move downward at an angle with respect to the vertical direction. The force with which the movable portion tends to move downward in the vertical direction is not limited to the weight of the movable portion itself, and may include the biasing force of a spring etc. that moves the movable portion downward in the vertical direction.

In the present embodiment, the unlock member 60C and the lock member 70C are separate members. However, the unlock member 60C and the lock member 70C may be a single-piece member.

Although the embodiments of the present invention are described above with reference to the drawings, the present invention is not limited to the illustrated embodiments. Various modifications and alterations can be made to the illustrated embodiments within the scope that is the same as or equivalent to that of the present invention.

The invention claimed is:

1. A nursery equipment, comprising:
   a fixed portion;
   a movable portion that is movable relative to the fixed portion and that is movable downward in a vertical direction; and
   an adjustment mechanism that adjusts a position or shape of the movable portion, wherein
   the adjustment mechanism includes
   a string connecting the fixed portion and the movable portion,
   a reel that is rotatable in both forward and reverse directions and that changes the position or shape of the movable portion by winding up and feeding out the string,
   a biasing member that biases the reel in such a way that the reel rotates in a winding direction of the string, and
   a lock member that prohibits rotation of the reel, and
   a biasing force of the biasing member is selected to be smaller than a biasing force with which the movable portion tends to move downward in the vertical direction.

2. The nursery equipment according to claim 1, wherein the adjustment mechanism further includes a one-way clutch mechanism that allows rotation of the reel in the winding direction of the string and prohibits rotation of the reel in a feeding direction of the string.

3. The nursery equipment according to claim 1, wherein the lock member includes a reel lock pawl that is movable between a first position and a second position, the first position being a position in which the reel lock pawl engages with a portion that rotates with the reel and prohibits rotation of the reel, and the second position being a position in which the reel lock pawl disengages from the portion that rotates with the reel and allows rotation of the reel.

4. The nursery equipment according to claim 3, wherein the adjustment mechanism further includes an unlock member that moves the lock member to the second position to allow the reel to rotate freely.

5. The nursery equipment according to claim 1, wherein the biasing member is a mainspring, and
   one end of the mainspring is fixed to the reel, and the other end of the mainspring is fixed to a housing of the adjustment mechanism.

6. The nursery equipment according to claim 1, wherein the nursery equipment is a car seat, and
   the fixed portion is a seat, and the movable portion is a body restraint strap attached to the seat.

7. A nursery equipment, comprising:
   a fixed portion;
   a movable portion configured to be movable relative to the fixed portion and that is movable downward in a vertical direction; and
   an adjustment mechanism configured to adjust a position or shape of the movable portion, the adjustment mechanism comprising:
   a string connecting the fixed portion and the movable portion;
   a reel configured to be rotatable in both forward and reverse directions and to change the position or shape of the movable portion by winding up and feeding out the string;
   a biasing member configured to bias the reel in such a way that the reel rotates in a winding direction of the string; and
   a lock member configured to prohibit rotation of the reel,
   wherein a biasing force of the biasing member is selected to be smaller than a biasing force with which the movable portion tends to move downward in the vertical direction.

8. The nursery equipment according to claim 7, wherein the adjustment mechanism further comprises a one-way clutch mechanism configured to allow rotation of the reel in the winding direction of the string and prohibit rotation of the reel in a feeding direction of the string.

9. The nursery equipment according to claim 7, wherein the lock member comprises a reel lock pawl configured to be movable between a first position and a second position, the first position being a position in which the reel lock pawl engages with a portion that rotates with the reel and prohibits rotation of the reel, and the second position being a position in which the reel lock pawl disengages from the portion that rotates with the reel and allows rotation of the reel.

10. The nursery equipment according to claim 7, wherein the adjustment mechanism further comprises an unlock member configured to move the lock member to the second position to allow the reel to rotate freely.

11. The nursery equipment according to claim 7, wherein the biasing member comprises a mainspring.

12. The nursery equipment according to claim 11, wherein one end of the mainspring is fixed to the reel, and the other end of the mainspring is fixed to a housing of the adjustment mechanism.

13. The nursery equipment according to claim 7, wherein the nursery equipment comprises a car seat, the fixed portion comprises a seat, and the movable portion comprises a body restraint strap attached to the seat.

14. A method for using a nursery equipment, the method comprising:
rotating a reel of an adjustment mechanism of the nursery equipment in a forward direction or a reverse direction to change a position or shape of a movable portion of the nursery equipment connected to a fixed portion of the nursery equipment via a string by winding up and feeding out the string; and
locking a lock member of the adjustment mechanism to prohibit rotation of the reel,
wherein a biasing member of the adjustment mechanism biases the reel in such a way that the reel rotates in a winding direction of the string, and
wherein a biasing force of the biasing member is selected to be smaller than a biasing force with which the movable portion tends to move downward in the vertical direction.

15. The method according to claim 14, wherein the adjustment mechanism further comprises a one-way clutch mechanism configured to allow rotation of the reel in the winding direction of the string and prohibit rotation of the reel in a feeding direction of the string.

16. The method according to claim 14, further comprising moving a reel lock pawl of the lock member to a first position where the reel lock pawl engages with a portion that rotates with the reel and prohibits rotation of the reel.

17. The method according to claim 16, further comprising moving the reel lock pawl of the lock member to a second position where the reel lock pawl disengages from the portion that rotates with the reel and allows rotation of the reel.

18. The method according to claim 14, further comprising moving the lock member to the second position to allow the reel to rotate freely via an unlock member of the adjustment mechanism.

19. The method according to claim 14, wherein the biasing member comprises a mainspring, and wherein one end of the mainspring is fixed to the reel and the other end of the mainspring is fixed to a housing of the adjustment mechanism.

20. The method according to claim 14, wherein the nursery equipment comprises a car seat, the fixed portion comprises a seat, and the movable portion comprises a body restraint strap attached to the seat.

\* \* \* \* \*